United States Patent [19]
Mizukami et al.

[11] Patent Number: 5,723,962
[45] Date of Patent: Mar. 3, 1998

[54] NUMERICAL CONTROL METHOD AND NUMERICAL CONTROL DEVICE

[75] Inventors: Yuji Mizukami; Yoshihiko Tsurumi, both of Tokyo, Japan

[73] Assignee: Mitsubishi Denki Kabushiki Kaisha, Tokyo, Japan

[21] Appl. No.: 614,013

[22] Filed: Mar. 12, 1996

[30] Foreign Application Priority Data

Apr. 20, 1995 [JP] Japan ................................ 7-094728

[51] Int. Cl.⁶ .................................................. G05B 19/24
[52] U.S. Cl. .................. 318/571; 318/568.23; 318/603; 364/474.02; 364/474.28
[58] Field of Search .................................... 318/571, 573, 318/568.2, 568.21, 567, 568.13, 568.23, 569, 603; 364/474.02, 474.01, 474.28, 474.17, 474.31

[56] References Cited

U.S. PATENT DOCUMENTS

| | | | |
|---|---|---|---|
| 3,825,735 | 7/1974 | Bowers et al. | 318/573 |
| 3,854,081 | 12/1974 | Benaglio | 318/573 |
| 4,020,331 | 4/1977 | Kimura et al. | 318/571 |
| 4,287,460 | 9/1981 | Nozawa et al. | 318/571 |
| 4,652,804 | 3/1987 | Kawamura et al. | 381/573 |

FOREIGN PATENT DOCUMENTS

| | | |
|---|---|---|
| 63-205709 | 8/1988 | Japan . |
| 1-79808 | 3/1989 | Japan . |
| 2-121006 | 5/1990 | Japan . |
| 4-205114 | 7/1992 | Japan . |

*Primary Examiner*—John W. Cabeca
*Attorney, Agent, or Firm*—Sughrue, Mion, Zinn, Macpeak & Seas, PLLC

[57] ABSTRACT

A numerical control device according to the present invention progressively analyzes a machining program stored in a storage device by one program block or by a plurality of program blocks, computes a migration rate and a feed speed in each axial direction from an instructed moving position of a tool and a feed speed of the tool in an interpolating section, outputs a positional instruction to an object for control for each given cycle, and has a sampling time interval computing section for computing a sampling time so that a number of instruction pulses for each sampling time under a given feed speed is kept at a constant value when a migration rate for 1 block computed in the interpolating section is divided to a number of pulses for each sampling time, and an interruption controlling section for setting a variable sampling time.

8 Claims, 20 Drawing Sheets

F I G. 4 A
F I G. 4 B
F I G. 4 C
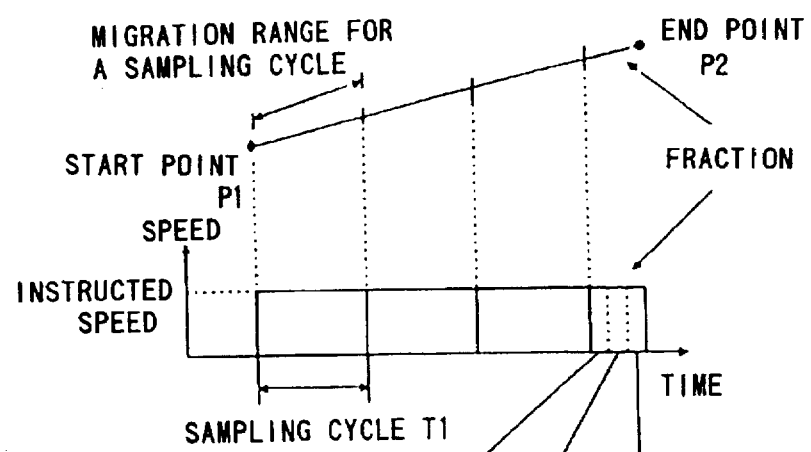

LOCUS ACCORDING TO INSTRUCTION FOR MIGRATION

TIMING FOR TRANSMISSION FROM ORDINARY NC TO SERVO

TRANSMISSION FROM NC TO SERVO

CASE WHERE INSTRUCTION CYCLE TO SERVO MADE VERY LONG AND PROCESSING FOR TRANSMISSION IN NC OMITTED

TRANSMISSION FROM NC TO SERVO (STAND-BY STATE)

1

NUMERICAL CONTROL METHOD AND NUMERICAL CONTROL DEVICE

FIELD OF THE INVENTION

The present invention relates to an axis control technique in a numerical control device, and especially to a numerical control device and a numerical control method in which, when executing a NC machining program, fluctuation in a feed speed and displacement of migration locus generated in an interval between a certain program block and a subsequent program block are eliminated, and a machining precision to a work is improved by outputting minute instructions during acceleration or deceleration.

BACKGROUND OF THE INVENTION

FIG. 16 is a block diagram showing general configuration of a conventional type of numerical control device. In this figure, the conventional type of numerical control device comprises a machining program 1, a program analyzing section 2, an interpolating section 3, a migration instruction pulse distributing section 4, an accelerating/decelerating section 5, an instruction pulse outputting section 6, a driving section 7, and a motor 8 which is an object for control.

The machining program 1 is an NC machining program, and is stored in a storage device. It should be noted that the machining program 1 is divided to a plurality of program blocks, and is treated also as a discrete program block in the numerical control device. The program analyzing section 2 analyzes the machining program 1, and computes a migration start point and a migration end point in each program block. The interpolating section 3 executes interpolation depending on a migration start point and a migration end point for each program block analyzed by the program analyzing section 2, and distributes migration rates in each axial direction, for instance, migration rates in the X, Y, and Z axial direction if the space for control is a three-dimensional space.

The migration instruction pulse distributing section 4 computes a migration rate for unit period of time depending on a migration rate in each axial direction obtained in the interpolating section 3 and outputs a speed instruction pulse. It should be noted that, as control of the motor 8 is executed once for every prespecified period of time (called sampling cycle hereinafter), a migration rate for the unit period of time is computed for one sampling cycle, and a pulse width of a speed instruction pulse corresponds to a sampling cycle.

The accelerating/decelerating section 5 receives a speed instruction pulse from the migration instruction pulse distributing section 4, and executes processing for acceleration or deceleration to the speed instruction pulse if there occurs any change in contents of the speed instruction. The instruction pulse outputting section 6 is an output interface for supplying the speed instruction pulse subjected to processing for acceleration or deceleration in the accelerating/decelerating section 5 to the driving section 7. Furthermore the driving section 7 controls the motor 8 which is an object for control according to the speed instruction pulse supplied thereto.

Next, a description is made for processing operations in the conventional type of numerical control device described above. In the following description, instructions for a start point and an end point of migration on a two-dimensional plane in each program block, and a speed instruction pulse set by the migration instruction pulse distributing section 4 to a specified sampling cycle are described, and problems in this numerical control device based on the conventional technology are clarified.

FIG. 17 shows a speed instruction pulse set by the speed instruction pulse distributing section 4 to a migration start point 101, a migration end point 102, and a specified sampling cycle T101, and this is a case where a fraction is not generated in the final sampling cycle when a migration rate for one program block is divided by a sampling cycle.

As described above, a speed instruction pulse supplied to the driving section 7 is computed for a specified sampling cycle. When a migration range and a feed speed in each axial direction are given depending on a result of analysis of a program block, the migration instruction pulse distributing section 4 computes a speed instruction pulse for each sampling time through the following relation;

Migration range for a sampling cycle=Feed speed×Sampling cycle

Also, if any change occurs in the speed instruction, processing for acceleration or deceleration is executed by the accelerating/decelerating section 5 to the speed instruction pulse, and the speed instruction pulse subjected to the processing for acceleration or deceleration is supplied via the instruction pulse outputting section 6 to the driving section 7, thus the motor 8 being driven.

For instance, if there occurs any change in a speed when program blocks each for cutting feed run successively, the cut surface may be damaged, and for this reason usually, in a case when a feed speed is constant the processing for acceleration or deceleration by the accelerating/decelerating section 5 or processing for stopping machining is not executed, and system control shifts to control processing by the next program block.

As a sampling cycle in each program block is kept at a constant value, in a case where a migration rate for one program block is divided by a sampling cycle, sometimes a fraction may be generated in the final sampling cycle due to a migration rate for the program block. The speed instruction pulse in that case is shown in FIG. 18. The figure shows a speed instruction pulse for a start point P101 and an end point P103 each of migration, and the sampling cycle T101.

As described above, if a speed instruction pulse with a fraction generated in the final sampling cycle is used as it is for drive control for the motor 8, a large change in speed is generated in an interval between program blocks, which disadvantageously lowers the machining precision.

As a technique for solving this problem, in the conventional technology, a technique of adding a fraction generated in the final sampling cycle to the next program block, or a technique of changing an amplitude of a speed instruction pulse (instructed speed) so that a fraction will not be generated in each program block has been employed.

FIG. 19 shows a speed instruction pulse in a case where the technique of adding a fraction of a speed instruction pulse generated in the final sampling cycle in a first program block to a speed instruction pulse in a first sampling cycle in a subsequent second program block is employed. FIG. 20 shows a speed instruction pulse in a case where the technique of changing an amplitude (instructed speed) of a speed instruction pulse for each program block so that a fraction will not be generated is employed.

At first, description is made for problems in a case where the technique of adding a fraction generated in the final sampling cycle to the next program block is employed with reference to FIGS. 21A and 21B. FIGS. 21A and 21B show speed instruction pulses generated by two program blocks, namely first and second program blocks, in a two-dimensional vector, the Y-axial direction and X-axial direction (FIG. 21A), a locus to be originally followed according to the instruction and the actual migration locus (FIG. 21B).

The machining program 1 in this concrete example is as shown below;

N1 G1 Y20. F1000;
N2 G1 X15. Y15.

Namely, in FIG. 21B, migration from a start point P104 to an end point P105 is instructed in the first program block and migration from a start point P105 to an end point P106 is instructed in the second program block, and thus control is provided according to a specified sampling cycle T101.

As shown in FIG. 21A, at first, as a directional instruction for a two-dimensional vector, a fraction of a speed instruction pulse generated in the final sampling cycle in the first program block is added to a speed instruction pulse in the first sampling cycle in the subsequent second program block, and a speed instruction pulse for a directional instruction of a vector is generated. Then, depending on the speed instruction pulse for a directional instruction for a vector, speed instruction pulses for each axial direction (Y-axial direction and X-axial direction) are generated.

For this reason, migration control in the first sampling cycle in the second program block is provided so that, although migration should originally be executed from a point P107 via a point 105 to a point 108, actually migration is made directly from the point P107 to a point P108. Namely, the actual locus of migration is displaced from the original one to be following according to the instruction, and an error is generated in the migration locus.

Next, a description is made for problems in a case where the technique of changing an amplitude of an instruction pulse (instructed speed) is employed so that a fraction will not be generated in each program block with reference to FIG. 22. FIG. 22 shows speed instruction pulses generated in three program blocks, namely in the first, second, and third program blocks. As understood from this figure, in this technique, an instructed speed is changed in each program block, so that a speed changes in each program block, and even in a case where an instructed speed should be kept at a constant level in a plurality of program blocks, sometimes a speed change occurs with the machining precision lowered.

Furthermore, FIG. 23 shows a speed instruction pulse in a case where it is tried to execute migration control causing rapid acceleration or deceleration by using the conventional technology. In a case where a rectangular form of speed change as indicated by the solid line is requested according to an instruction by a program, the generated acceleration or deceleration pattern is of a trapezoidal form as indicated by the dashed line. Also the speed instruction pulse actually generated is constant regardless of whether the sampling cycle is for acceleration or for deceleration, so that the instruction becomes very rough, and a speed change in acceleration or deceleration can not be set to a large value because the machining precision must be kept at a certain level.

As described above, in the conventional type of numerical control device, as a sampling cycle is kept at a constant value, the following problems occur.

Firstly, in a case where a fraction is generated in a speed instruction pulse for the final sampling cycle of a program block, a large speed change occurs in an interval between program blocks, which makes the machining precision lower.

Secondly, in a case where the technique of adding a fraction generated in the final sampling cycle to a subsequent program block is employed to solve the first problem described above, the actual migration locus is displaced from the one to be following originally, thus an error being generated in the migration locus with the machining precision lowered.

Thirdly, in a case where the technique of changing an amplitude of a speed instruction pulse so that a fraction will not be generated in each program block is employed to solve the first problem described above, a speed change occurs in each program block, and also a speed change occurs even in a case where an instructed speed should be kept at a constant level over a plurality of program blocks, which makes the machining precision lower.

Fourthly, in a case where migration control causing rapid acceleration or deceleration is provided, the instruction becomes rough, and it is impossible to largely change a speed in acceleration of deceleration, because the machining precision must be kept at a certain level.

SUMMARY OF THE INVENTION

It is an object of the present invention to provide a numerical control method and a numerical control device, in which a high precision machining in an interval is realized by eliminating a change in a feed speed and displacement of migration locus generated in an interval of machining between program blocks and an allowance is generated in processing by a numerical control device by reducing work load to the numerical control device.

It is another object of the present invention to enable minute migration control even in machining causing rapid acceleration or deceleration and to improve a machining precision in machining a work.

In a numerical control method according to one aspect of the present invention, in a case where a migration rate and a feed speed in each axial direction are computed from a moving position of a tool and a feed speed of the tool by progressively analyzing a machining program by one program block or by a plurality of program blocks, an instruction pulse divided by a specified sampling cycle is generated depending on the computed migration rate and feed speed, and timing for output of the instruction pulse to an object for control is controlled according to the sampling cycle, the sampling cycle is changed so that a fraction will not be generated in the instruction pulse, whereby a sampling cycle can be changed by one program block or by a plurality of program blocks, which allows elimination of fluctuation in a feed speed and displacement of migration locus generated in an interval of machining between program blocks.

In a numerical control method according to another aspect of the preset invention, a moving position of a tool and a feed speed of the tool are obtained by progressively analyzing a machining program by one program block or a plurality of program blocks, a migration rate and a feed speed are computed according to the moving position of a tool as well as a feed speed of the tool, a sampling cycle is changed so that a fraction for an instruction pulse will not be generated in the one program block nor in the plurality of program blocks, an instruction pulse evenly divided by the changed sampling cycle depending on the computed migration rate and feed speed is generated, and timing for output of the generated instruction pulse to an object for control is controlled according to the sampling cycle, whereby a sampling cycle can be changed by one program block or by a plurality of program blocks, which allows elimination of fluctuation in a feed speed and displacement of migration locus generated in an interval of machining between program blocks.

In a numerical control device according to another aspect of the present invention, an analyzing means obtains a moving position of a tool and a feed speed of the tool by progressively analyzing a machining program by one program block or by a plurality of program blocks, an interpolating means computes a migration rate and a feed speed according to the moving position of a tool and feed speed of the tool, a sampling cycle computing means changes a sampling cycle so that a fraction of an instruction pulse will not be generated in one program block or in a plurality of program blocks, an instruction pulse generating means generates an instruction pulse evenly divided by the changed sampling cycle depending on the computed migration rate and feed speed, and a sampling control means controls timing for output of the generated instruction pulse to an object for control according to a sampling cycle, whereby a sampling cycle can be changed by one program block or by a plurality of program blocks, which allows elimination of fluctuation in a feed speed as well as displacement in the migration locus generated at intervals of machining between program blocks.

In a numerical control device according to another aspect of the present invention, the sampling cycle computing means equalizes the sampling cycle, whereby fluctuation in a feed speed and displacement of migration locus generated in an interval of machining between program blocks can be eliminated.

In a numerical control device according to another aspect of the present invention, the sampling cycle computing means changes a sampling cycle more largely than the initial sampling cycle when, in a final sampling cycle for one program block or for a plurality of program blocks, an instruction pulse for the final sampling cycle is a fraction smaller than an instruction pulse in other sampling cycle, whereby a work load to a numerical control device can be reduced.

In a numerical control device according to another aspect of the present invention, the sampling cycle computing means determines depending on the feed speed computed by the interpolating means whether the current operating mode is in acceleration or deceleration or in migration at a constant speed, sets a sampling cycle to a shorter period of time than that for migration at a constant speed in acceleration or deceleration, and sets a sampling cycle to a longer period of time than that for acceleration or deceleration in migration at a constant speed. As described above, controls for a speed can be provided by changing it smoothly by making a sampling cycle shorter period of time in acceleration or deceleration, and work load to the numerical control device can be reduced by making a sampling cycle longer period of time in migration at a constant speed.

In a numerical control device according to another aspect of the present invention, the sampling cycle computing means determines whether an instruction for migration has been issued or not, and sets a sampling cycle to a period of time longer than a specified value, for instance, to an infinite period of time when an instruction for migration has not been issued, and sets the device in the stand-by state, thus a work load to a numerical control device being reduced.

In a numerical control device according to another aspect of the present invention, the sampling cycle computing means changes, when it receives an instruction for override, the sampling cycle so that a fraction will not be generated in the instruction pulse, whereby even in the override mode, fluctuation in a feed speed and displacement of migration locus generated in an interval of machining between program blocks can be eliminated.

Other objects and features of this invention will become understood from the following description with reference to the accompanying drawings.

BRIEF DESCRIPTION OF THE DRAWINGS

FIGS. 4A to 4C are explanatory views of an speed instruction pulse to an concrete instruction for migration based on a conventional technology as well as on Embodiment 1;

DESCRIPTION OF THE PREFERRED EMBODIMENTS

Figure 1:
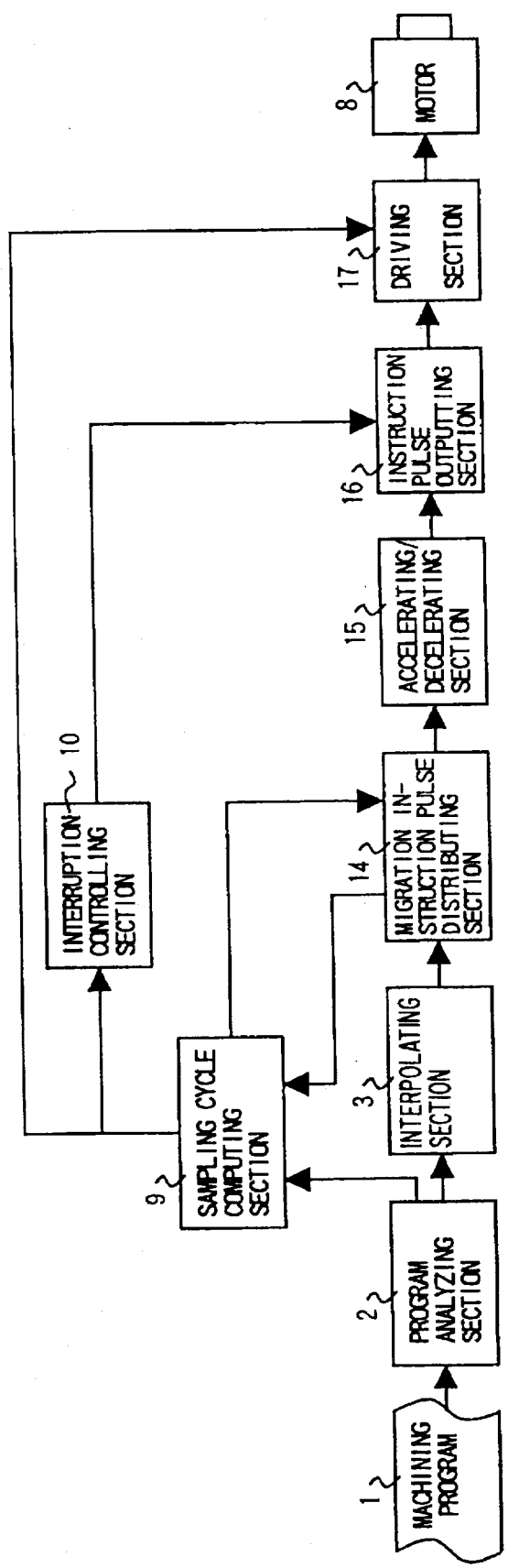
FIG. 1 is a block diagram showing general configuration of a numerical control device according to an embodiment of the present invention.

Description is made hereinafter for embodiments of a numerical control device according to the present invention with reference to drawings. FIG. 1 is a block diagram showing general configuration of the numerical control device according to Embodiment 1 of the present invention. The numerical control device in the embodiment can reset a sampling cycle so that a sampling cycle in the program block is kept at a constant level with the instructed feed speed when a speed instruction pulse divided by a sampling cycle is generated according to a migration rate and a feed speed for one program block.

Figure 16:
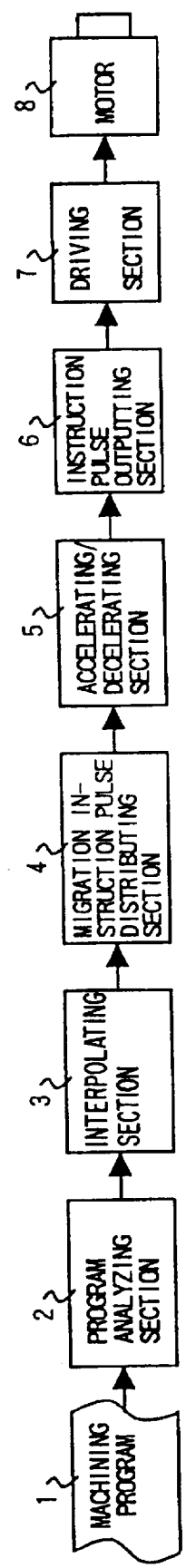
FIG. 16 is a block diagram showing general configuration of the conventional type of numerical control device.
Figure 17:
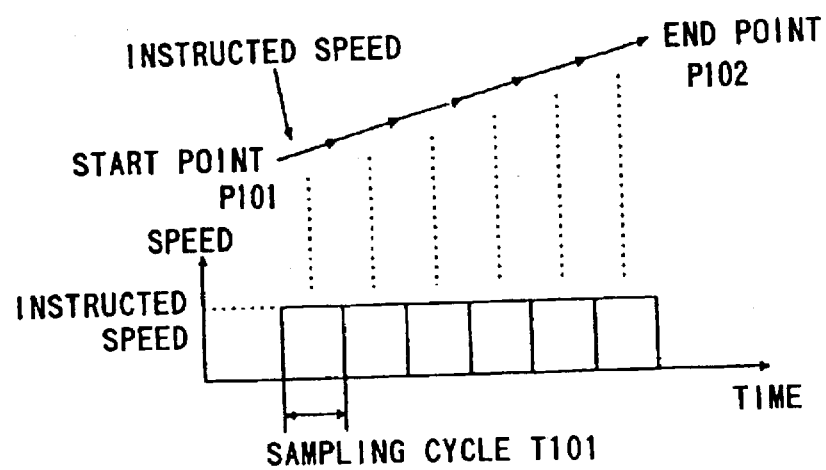
FIG. 17 is an explanatory view showing a method of dividing a migration rate in each program blocks by a sampling cycle to speed instruction pulses in an example based on the conventional technology.
Figure 18:
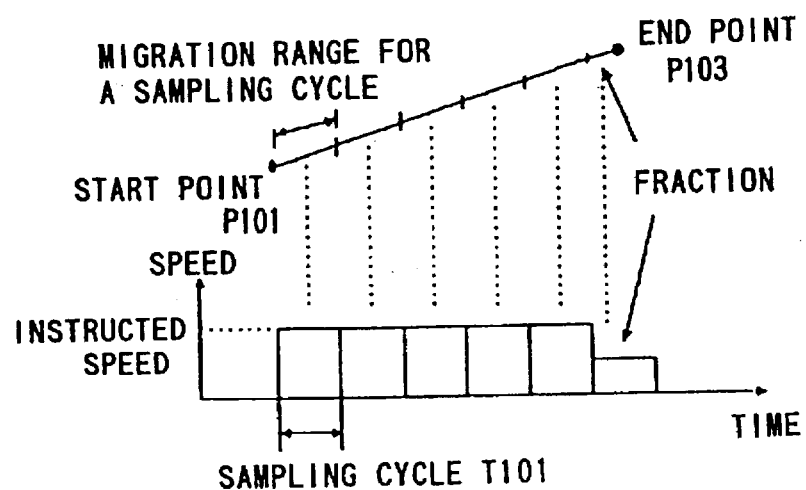
FIG. 18 is an explanatory view showing a method of dividing a migration rate in each program blocks by a sampling cycle to speed instruction pulses in the example based on the conventional technology; and more specifically, showing a case where a fraction of the speed instruction pulse is generated in a final sampling cycle.
Figure 19:
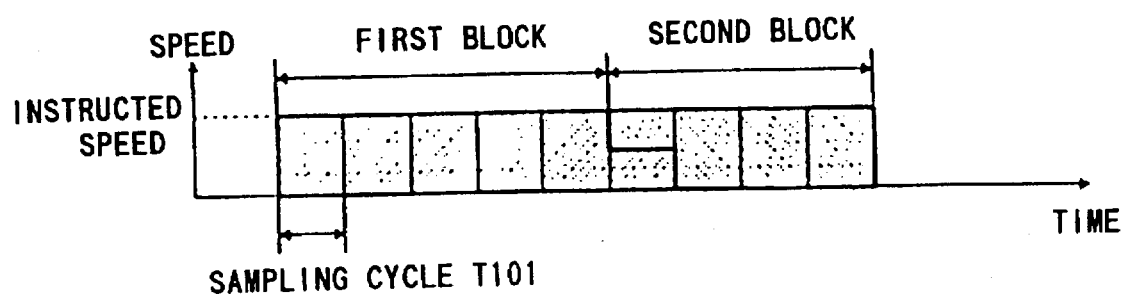
FIG. 19 is an explanatory view showing a method of dividing a migration rate in each program blocks by a sampling cycle to speed instruction pulses in the example based on the conventional technology; and more specifically, showing an explanatory view of a first method of dealing with a case where a fraction has been generated in the speed instruction pulse.
Figure 20:
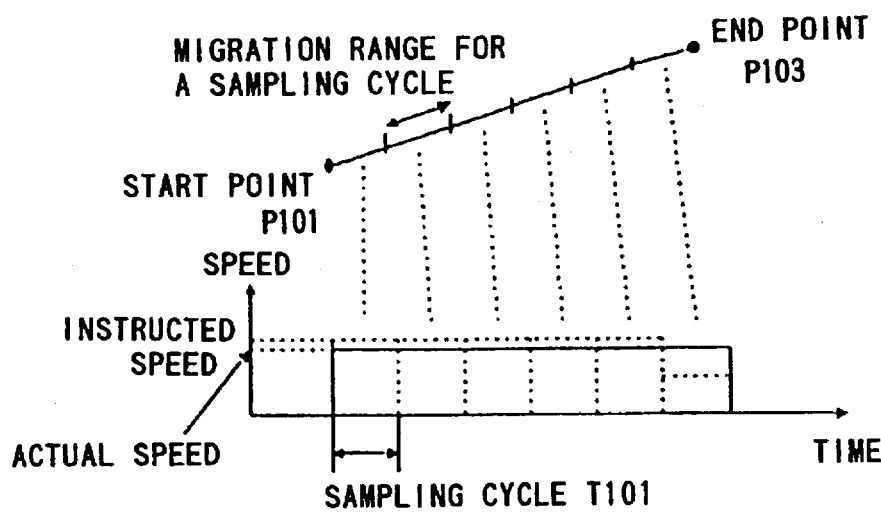
FIG. 20 is an explanatory view showing a method of dividing a migration rate in each program blocks by a sampling cycle to speed instruction pulses in the example based on the conventional technology; and more specifically, showing an explanatory view of a second method for dealing with a case where a fraction has been generated in the speed instruction pulse.

In FIG. 1, the numerical control device of the present embodiment comprises a machining program 1, a program analyzing section (analyzing means) 2, an interpolating section (interpolating means) 3, a migration instruction pulse distributing section (instruction pulse generating section) 14, an accelerating/decelerating section 15, an instruction pulse outputting section 16, a driving section 17, a sampling time interval computing section (sampling cycle computing means) 9, an interruption controlling section (sampling controlling section) 10, and a motor 8 which is an object for control. It should be noted that, in the figure, the same reference numerals are assigned to the components playing the same functions as those in the example based on the conventional technology (FIG. 16), and description thereof is omitted herein.

The migration instruction pulse distributing section 14 computes a migration rate in each axial direction constituting control space obtained in the interpolating section 3, for instance, in the X-axial direction, Y-axial direction, and Z-axial direction, and a migration rate for a unit time depending on a feed speed in each axial direction, and outputs speed instruction pulses in each axial direction. It should be noted that control for the motor 8 is executed for a certain time interval (called as a sampling cycle hereinafter), so that a migration rate for a unit time is computed for one sampling cycle, and a pulse width of a speed instruction pulse corresponds to a sampling cycle. Also in the sampling cycle, at first a normal sampling cycle is set to a default value, and is distributed to instruction pulses in each axial direction and generated by the migration instruction pulse distributing section 14, but if necessary according to the generated speed instruction pulse, the sampling cycle is reset by the sampling cycle computing section 9, and the reset sampling cycle is distributed again to speed instruction pulses in each axial direction by the migration instruction pulse distributing section 14.

The sampling cycle computing section 9 receives the speed instruction pulses divided by the normal sampling cycle (default value) in the migration instruction pulse distributing section 14, determines for one program block whether a speed instruction pulse which will be a fraction in a final sampling cycle has been generated or not, and if it is determined that a fraction has been generated, the sampling cycle is reset so that the sampling cycle in the program block is kept at a constant level without generating a fraction due to the instructed feed speed.

Figure 2:
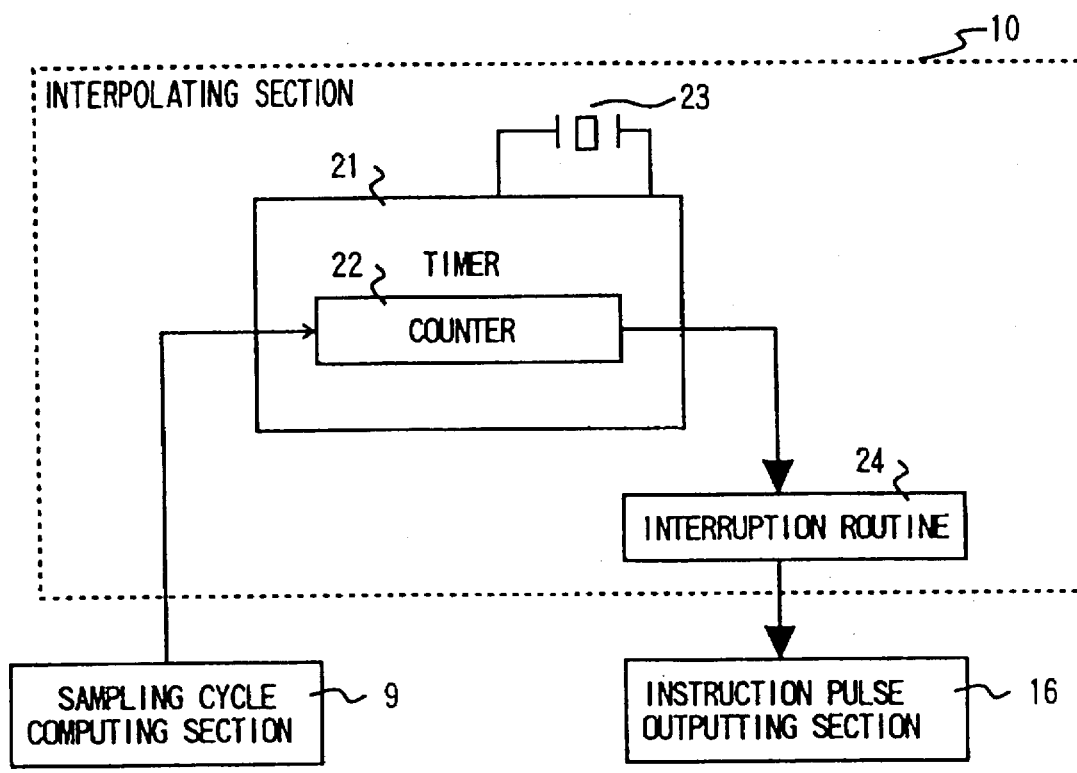
FIG. 2 is a concrete block diagram showing an interruption controlling section in the numerical control device according to an embodiment of the present invention.

The interruption controlling section 10 generates an interruption to the instruction pulse outputting section 16 for the sampling cycle according to the sampling cycle set in the sampling cycle computing section 9. FIG. 2 is a block diagram showing concrete configuration of the interruption controlling section 10. In the figure, the interruption control section 10 comprises a timer 21, a counter 22, an oscillator 23 to have the timer 21 operate, and an interruption routine 24.

The interruption controlling section 10 decides a value for a counter 22 from the sampling cycle set in the sampling cycle computing section 9, and sets it to the counter 22. When a value for the timer 21 computed by the oscillator 23 reaches the preset value for the counter 22, the timer 21 outputs a request for interruption to the interruption routine 24. The interruption routine 14 responds to the request for interruption and generates an interruption to the instruction pulse outputting section 16. Whereby the interruption controlling section 10 controls an output timing from the instruction pulse outputting section 16 by the preset sampling cycle.

The accelerating/decelerating section 15 receives speed instruction pulses from the migration instruction pulse distributing section 14, and in a case where change in contents of the instruction for a speed occurs, executes processing for acceleration or deceleration to the speed instruction pulse. The instruction pulse outputting section 16 is an output interface supplying the speed instruction pulse subjected to the processing of acceleration or deceleration in the accelerating/decelerating section 15 to the driving section 17, and responds to the interruption from the interruption controlling section 10 to output a speed instruction pulse. Further, the driving section 17 controls the motor 8 which is an object for control depending on the supplied speed instruction pulse and the sampling cycle preset in the sampling cycle computing section 9.

Next, a description is made for processing by the numerical control device according to the present embodiment. At first, the program analyzing section 2 analyzes a machining program 1 stored in a storage device for one program block, and computes a start point of migration and an end point thereof in the program block according to the instructed moving position for a tool and a feed speed for the tool. The interpolating section 3 executes an interpolating processing according to the computed start point for migration as well as the end point for migration, which are distributed to a migration rate in each axial direction and a feed speed in each axial direction.

Figure 3:
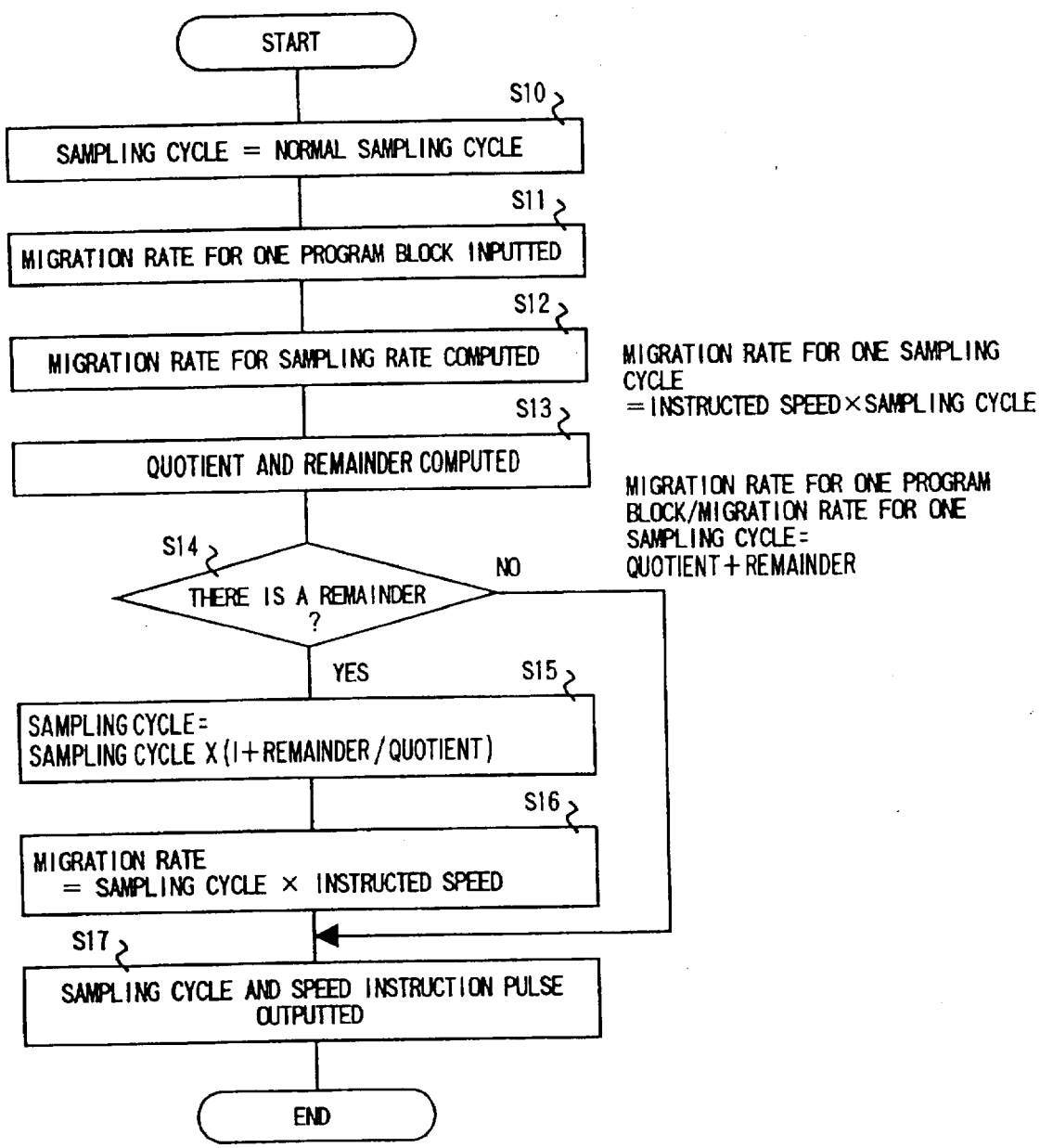
FIG. 3 is a flow chart for explanation of processing in a migration instruction pulse distributing section as well as a sampling time interval computing section according to Embodiment 1.

Next detailed description is made for each processing by the migration instruction pulse distributing section 14 as well as by the sampling time interval computing section 9, each of which is a portion peculiar to the present embodiment, with reference to FIG. 3 and FIGS. 4A to 4C. FIG. 3 is a flow chart for explanation of the processing of the migration instruction pulse distributing section 14 and sampling time interval computing section 9, and FIGS. 4A to 4C are views for explanation of the speed instruction pulse based on the conventional technology and on the present embodiment to the concrete instruction for migration.

It should be noted that, in the embodiment shown in FIGS. 4A to 4C, in contrast to the start point P1 as well as the end point P2 for migration (Refer to FIG. 4A), a conventional type of speed instruction pulse in FIG. 4B is a speed instruction pulse generated according to a sampling cycle T1, and it is a case where a fraction is generated in the final sampling cycle when the migration rate for one program block is divided by the sampling cycle T1. While a speed instruction pulse in the embodiment shown in FIG. 4C is a speed instruction pulse generated according to the reset sampling cycle T2, and for this reason a fraction will not be generated in the final sampling cycle.

In FIG. 3, steps S10 to S12 and steps S16, S17 are processing each executed by the migration instruction pulse distributing section 14, and steps S14, S15, and S17 are processing each executed by the sampling time interval computing section 9.

At first in step S10, a normal sampling cycle T1 which is a default value is set as a sampling cycle. Then in step S11, a migration rate and a feed speed (instructed speed) for one program block are received from the interpolating section 3. Then in step S12, a migration rate for one sampling cycle is computed from the received instructed speed and the preset sampling cycle T1. The computing expression is as follows. Namely:

Migration rate for one sampling cycle=Instructed speed×Sampling cycle (T1)

The speed instruction pulse generated by the processing as described above is equivalent to the conventional type, which is shown in FIG. 4B.

Then in step S13, a quotitient and a remainder for one program block according to a sampling cycle are computed. The computing expression is as follows. Namely:

Migration rate for one program block/Migration rate for one sampling cycle=Quotitient+Remainder Then in step S14, determination is made as to whether there is a remainder or not (a remainder is not equal to zero or not). When it is determined that there is no remainder therein, system control goes to step S17. Also, when it is determined that there is a remainder, system control goes to step S15, and a sampling cycle is reset so that the remainder becomes zero. The expression is as follows. Namely:

Sampling cycle=Sampling cycle×(1+Remainder/Quotitient)

Whereby the reset sampling cycle T2 can be obtained.

In step S16, a migration rate for one sampling cycle is computed again from the instructed speed and the reset sampling cycle T2. The computing expression is as follows. Namely:

Migration rate for one sampling cycle=Instructed speed×Sampling cycle (T2)

The speed instruction pulse regenerated as described above is shown in FIG. 4C. It should be noted that in the example shown in FIG. 4C as described above, when a sampling cycle is to be equalized, an equalized sampling cycle, although it is set a period of time longer than the initial sampling cycle, may be set to a period of time shorter than the initial sampling cycle.

Furthermore, in step S17, the reset sampling cycle T2 is outputted from the sampling time interval computing section 9 to the interruption controlling section 10 and the driving section 17, and also the regenerated speed instruction pulse is outputted from the migration instruction pulse distributing section 14 to the accelerating/decelerating section 15. With this step, each processing in the migration instruction pulse distributing section 14 and sampling time interval computing section 9 is complete.

Then, in the accelerating/decelerating section 15, a speed instruction pulse is received from the migration instruction pulse distributing section 14, and in a case where any change in contents of the instruction for a speed occurs, processing for acceleration or deceleration is executed to the speed instruction pulse. Then in the instruction pulse outputting section 16, the speed instruction pulse to which the processing for acceleration or deceleration is executed in the accelerating/decelerating section 15 is supplied to the driving section 17. Such supplying is executed according to interruption from the interruption controlling section 10. Further in the driving section 17, the motor 8 which is an object for control is controlled according to the supplied speed instruction pulse and the sampling cycle (T2) reset in the sampling cycle computing section 9.

Figure 5A:
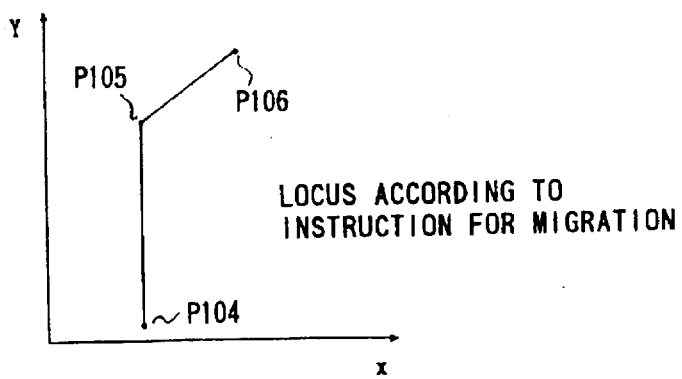
FIG. 5A is an explanatory view of a locus according to an instruction for migration with two program blocks.
Figure 5B:
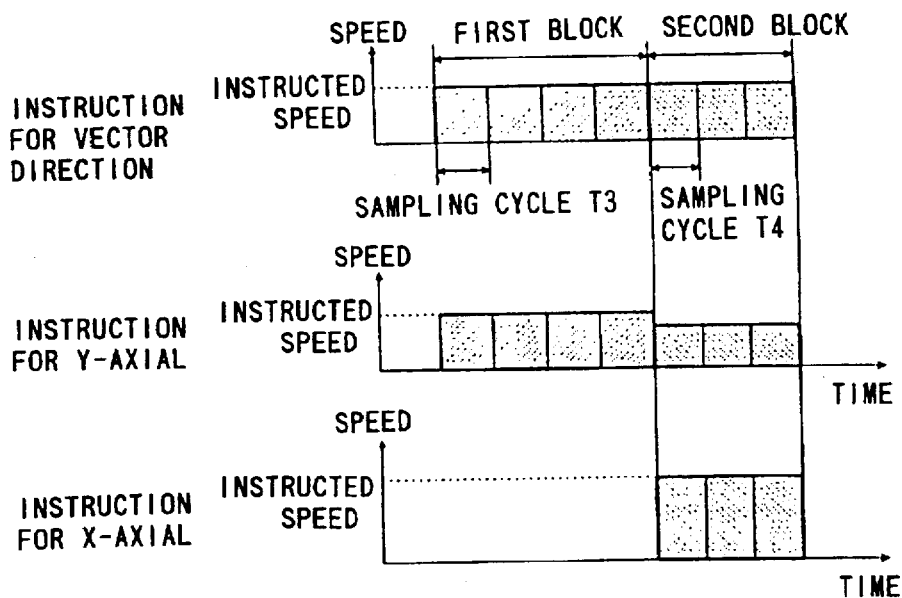
FIG. 5B is an explanatory view of speed instruction pulses in the two-dimensional vector, Y-axial direction, and X-axial direction to be generated.
Figure 21A:
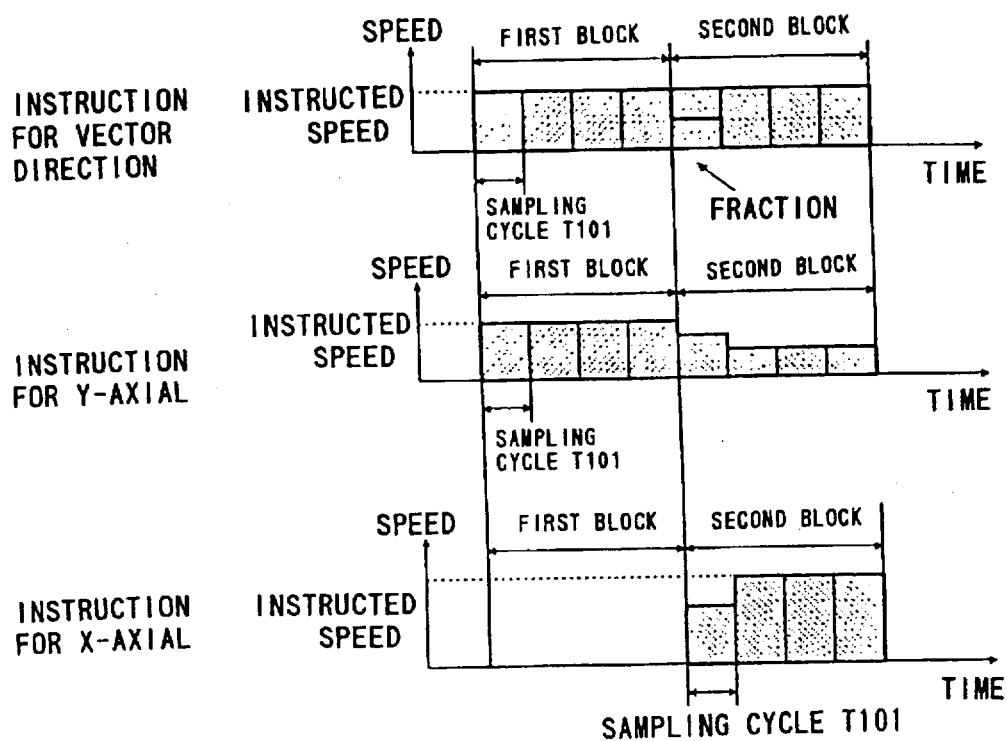
FIGS. 21A and 21B are explanatory views of some problems in a case where the first method of dealing with those in the example based on the conventional technology is employed (FIG. 21A is an explanatory view of a speed instruction pulse generated according to two program blocks in the two-dimensional vector, Y-axial direction, and X-axial direction, FIG. 21B is an explanatory view of an instruction and an actual migration locus thereof)
Figure 21B:
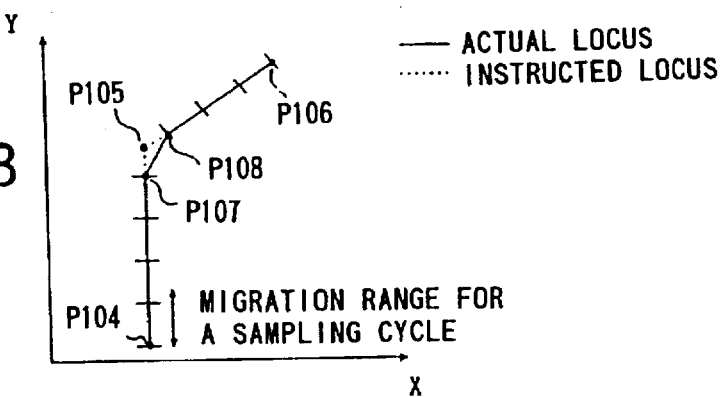
Figure 22:
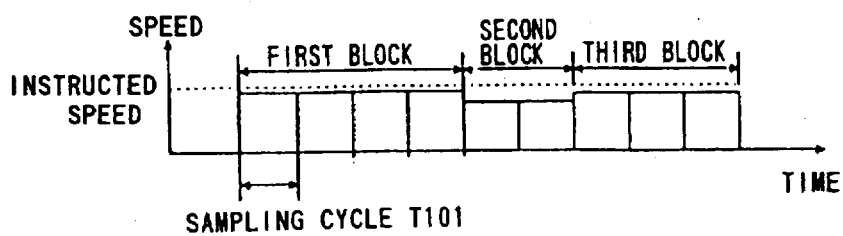
FIG. 22 is an explanatory view of some problems in a case where the second method of dealing with those in the example based on the conventional technology is employed.

Next, a description is made to explain with reference to concrete examples that, with the numerical control device according to the present embodiment, the problems in the conventional technology as described above can be solved. Namely, the present embodiment is applied to a concrete example (Refer to FIG. 21) used to explain the problems in the technique in which a fraction generated in the final sampling cycle is added to a subsequent program block. FIG. 5A is a view for explaining a locus according to an instruction for migration according to first and second program blocks. FIG. 5B is an explanatory view for speed instruction pulses generated by the two program blocks in the two-dimensional vector, the Y-axial and X-axial directions, and FIG. 5C is an explanatory view for an actual migration locus according to the generated speed instruction pulses.

FIG. 5A shows migration from a start point P104 to an end point P105 in the first program block and migration from the start point P105 to an end point P106 in the second program block respectively.

Also as shown in FIG. 5B, a speed instruction pulse is generated. Namely, at first a sampling cycle is reset to T3 and T4 by a sampling cycle computing section 9 for first and second program blocks respectively. Then a speed instruction pulse (directional instruction for a two-dimensional vector) is generated by the migration instruction pulse distributing section 14 according to the sampling cycles T3 and T4 as well as to the feed speed (instructed speed) reset as described above, and speed instruction pulses for each axial direction (Y-axial and X-axial directions) are generated according to the speed instruction pulse based on the directional instruction for the vector.

Figure 5C:
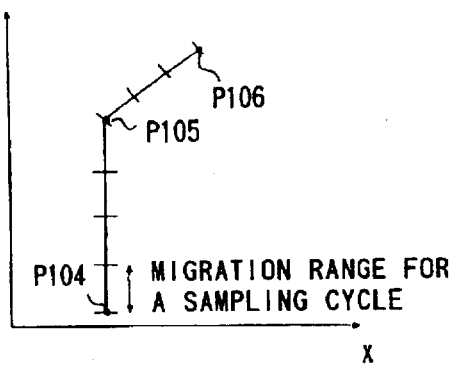
FIG. 5C is an explanatory view of an actual migration locus thereof.

As described above, in the present embodiment, a sampling cycle is reset so that a fraction will not be generated in each program block, and a fraction generated in a program block does not affect a speed instruction pulse in a subsequent program block like in the conventional technology, so that the actual migration locus does not displace from an instructed migration locus and accurate operations are insured as shown in FIG. 5C.

As described above, in the numerical control device according to the present embodiment, when a speed instruction pulse divided by a sampling cycle is generated according to a migration rate and a feed speed for one program block, a sampling cycle is reset so that the sampling cycle in the program block for the instructed feed speed will be kept at a constant value, so that, for instance, when a machining instruction is given from a machining program in which operations for cutting and feeding are executed successively, the sampling cycle for each program block changes with a speed change in an interval between program blocks eliminated, and as a result a shape of a section between an area machined according to a program block and another area machined according to a subsequent program block can precisely be machined.

Next, a description is made for a numerical control device according to Embodiment 2 of the present invention. The numerical control device according to the present embodiment changes a final sampling cycle so that a fraction will not be generated in a case where otherwise a fraction is generated in the final sampling cycle for the program block when generating a speed instruction pulse divided by the sampling cycle from a migration rate and a feed speed by one program block.

Configuration of the numerical control device according to the present embodiment is the same as that in Embodiment 1 (Refer to FIG. 1). However, the migration instruction pulse distributing section 14 and sampling cycle computing section 9 have functions different from those in Embodiment 1.

Namely, in the migration instruction pulse distributing section 14, at first like in Embodiment 1, a migration rate for a sampling cycle (default value) is computed according to a migration rate in each of axial directions constituting a control space obtained in the interpolating section 3, for instance, X-axial direction, Y-axial direction, and Z-axial direction, as well as to a feed speed in each axial direction, and a speed instruction pulse in each axial direction is outputted. If necessary according to the generated speed instruction pulse, a second sampling cycle is computed by the sampling cycle computing section 9, and a speed instruction pulse in each axial direction is generated by the migration instruction pulse distributing section 14 using the second sampling cycle.

The sampling cycle computing section 9 receives the speed instruction pulse generated in a normal sampling cycle (default value) in the migration instruction pulse distributing section 14, determines whether a speed instruction pulse which may be a fraction in the subsequent sampling cycle is generated or not by a sampling cycle of program blocks, and when generating a fraction, computes the final sampling cycle as the second sampling cycle by the instructed feed speed so that a fraction will not be generated in the final sampling cycle in the program block.

Next, a description is made for processing by the numerical control device according to the present embodiment. Processing other than those in the migration instruction pulse distributing section 14 and sampling time interval computing section 9 is the same as that in Embodiment 1, so that description thereof is omitted herein.

Figure 6:
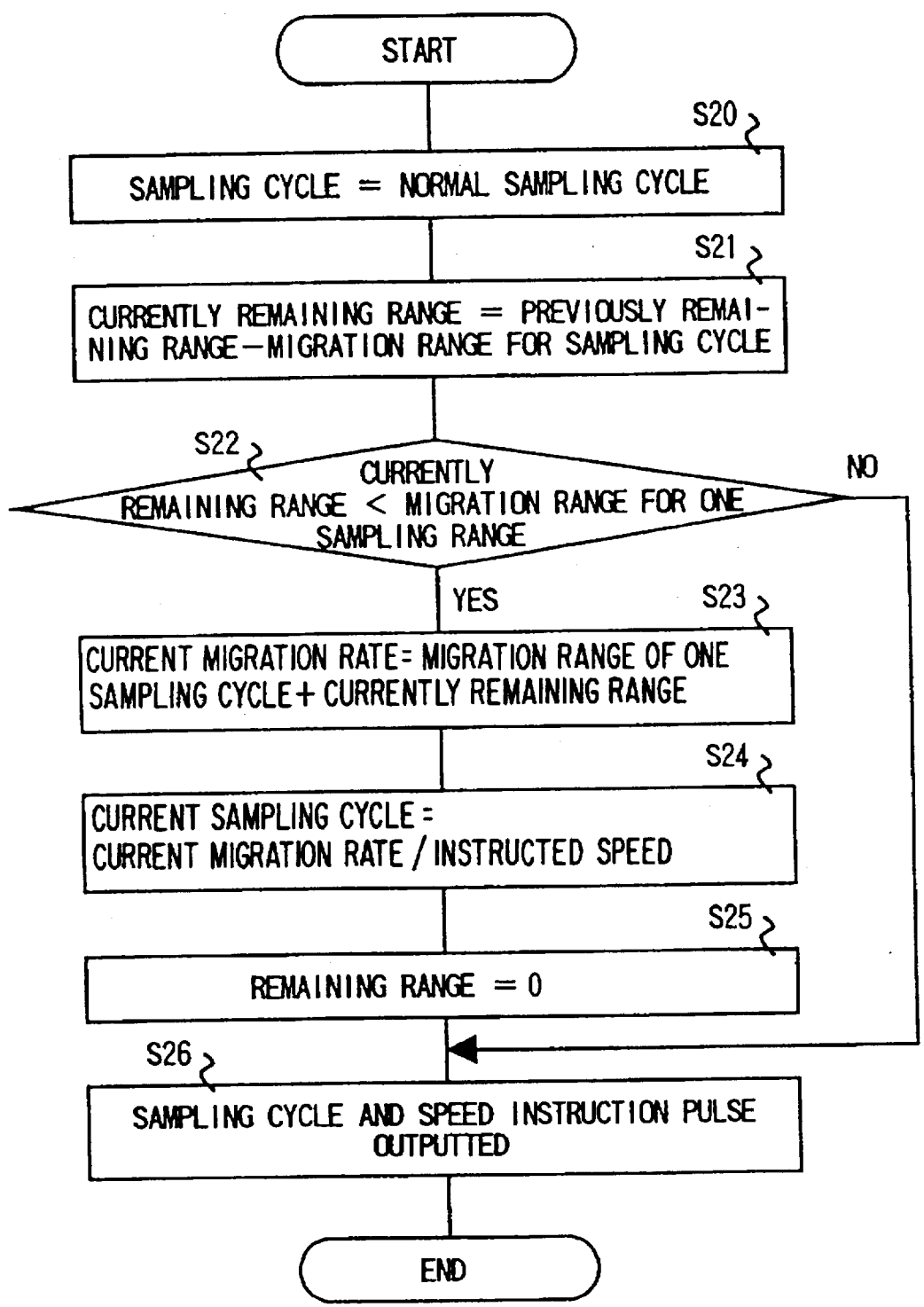
FIG. 6 is a flow chart for explanation of processing by a migration instruction pulse distributing section as well as by a sampling time interval computing section according to Embodiment 2.
Figure 7:
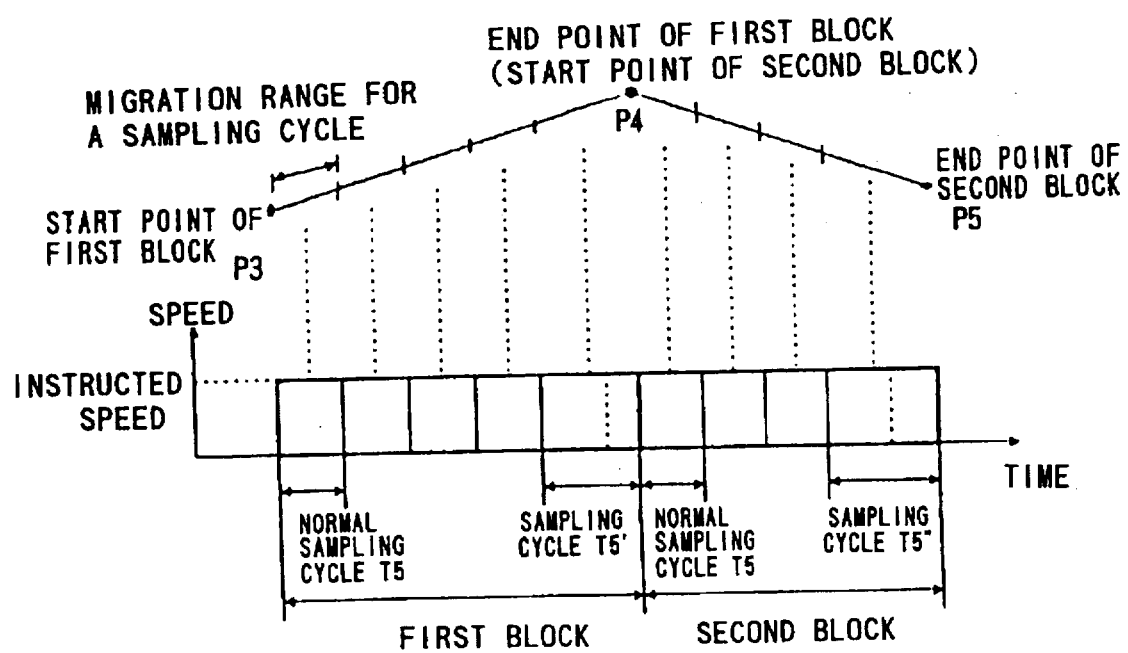
FIG. 7 is an explanatory view of an speed instruction pulse to a concrete instruction for migration according to Embodiment 2.

Detailed description is made for processing by the migration instruction pulse distributing section 14 and sampling time interval computing section 9 with reference to FIG. 6 and FIG. 7. FIG. 6 is a flow chart for explanation of the processing by the migration instruction pulse distributing section 14 and sampling time interval computing section 9, and FIG. 7 is a view for explanation of a speed instruction pulse to a concrete instruction for migration.

It should be noted that the concrete example in FIG. 7 shows a case where migration control according to two program blocks such as a first and a second program blocks is provided, in which it is assumed that a start point P3 and an end point P4 of migration are computed from the first program block, and a start point P4 and an end point P5 of migration are computed from the second program block, and an instructed speed in the first program block is the same as that in the second program block.

The flow chart in FIG. 6 shows processing executed with a sampling cycle for each program block, steps S20, S26 indicate processings each executed by the migration instruction pulse distributing section 14, and steps S21 to S26 indicate processing each executed by the sampling time interval computing section 9. In the following description, as processing is the same for a program block, the first program block is described.

In step S20, a sampling cycle is set to the normal sampling time T5, which is a default value. Then in step S21, a migration range (currently remaining range) which should remain in the program block is computed depending on the migration range remaining at the point of time when the previous sampling cycle ended (previously remaining range) and the migration range for a sampling cycle T5 at the point of time when the current sampling cycle ends. The expression for computing is as follows:

Currently remaining range=Previously remaining range−Migration range for a sampling cycle (T5)

It is assumed herein that in an initial step of processing for each program block, a migration rate of the program block is set to the previously remained range, and the migration rate corresponds to the previously remained range in the initial sampling cycle.

In step S22, determination is made as to whether the currently remaining range computed as described above is smaller than a migration range for one sampling cycle T5 or not. Herein, in a case where it is determined that the currently remaining range is more than the migration range of one sampling time, a fraction is not generated in the subsequent sampling cycle, and system control goes to step S26. Also in a case where it is determined that the currently remained range is smaller than the migration range of one sampling time, a fraction is generated in the subsequent sampling cycle, and system control goes to step S23 to compute the second sampling cycle therein.

In step S23, a migration rate to be controlled by the current sampling cycle (current migration rate) is computed through the following expression.

Current migration rate=Migration range of one sampling cycle+ Currently remaining range In step S24, the current sampling cycle (the second sampling cycle) T5′ is computed through the following expression, and is reset. Namely:

Second sampling cycle=Current migration rate/Instructed speed

Then, because the sampling cycle being in the path of this sequence of processing indicates the fact that the sampling cycle at the current point of time is a final one in the program block, the remaining range is reset to zero (0) in step S25 for processing by the subsequent program block.

Furthermore, in step S26, the second sampling cycle T5' computed in the sampling cycle T5 or sampling time interval computing section 9 is outputted to the interruption controlling section 10, migration instruction pulse distributing section 14, and driving section 17, and also the speed instruction pulse generated depending on the sampling cycle T5 or second sampling cycle T5' is outputted from the migration instruction pulse distributing section 14 to the accelerating/decelerating section 15.

As described above, in the numerical control device according to the present embodiment, when a speed instruction pulse divided by a sampling cycle is generated according to a migration rate and a feed speed for one program block, and in a case where a fraction is generated in the final sampling cycle of the program block, the final sampling cycle is changed so that a fraction is not generated, so that, for instance, when a instruction for machining is given from a machining program in which operations for cutting and feeding are executed successively, the sampling cycle can be changed for each program block, which eliminates effects over other program blocks as well as a speed change in an interval between program blocks, and as a result a shape of a section between an area machined according to a program block and another area machined according to a subsequent program block can precisely be machined.

Next, a description is made for a numerical control device according to Embodiment 3 of the present invention. The numerical control device according to the present embodiment provides controls for smooth migration by making a sampling cycle in acceleration or deceleration shorter when generating a speed instruction pulse divided by a sampling cycle according to a migration rate and a feed speed for a program block including control for acceleration or deceleration.

Configuration of the numerical control device according to the present embodiment is the same as that in Embodiment 1 (Refer to FIG. 1). However, the migration instruction pulse distributing section 14 and sampling cycle computing section 9 have functions different from those in Embodiment 1.

Namely, in the migration instruction pulse distributing section 14, at first like in Embodiment 1, a migration rate for a sampling cycle (default value) is computed according to a migration rate in each of axial directions constituting a control space obtained in the interpolating section 3, for instance, X-axial direction, Y-axial direction, and Z-axial direction, as well as to a feed speed in each axial direction, and an speed instruction pulse in each axial direction is outputted. If necessary according to the generated speed instruction pulse, a second sampling cycle is computed by the sampling cycle computing section 9, and a speed instruction pulse in each axial direction is generated by the migration instruction pulse distributing section 14 using the second sampling cycle.

Also the sampling cycle computing section 9 receives a speed instruction pulse generated in an ordinary sampling cycle (default value) in the migration instruction pulse distributing section 14, determines whether control is for acceleration or deceleration or not once for each sampling cycle, and if it is determined that the control is for acceleration or deceleration, and a sampling cycle is set to a second sampling cycle obtained by dividing the ordinary sampling cycle by a specified positive integral value.

Next, a description is made for processing operations of the numerical control device according to the present embodiment. The processing other than those by the migration instruction pulse distributing section 14 and the sampling time interval computing section 9 are the same as those described in relation to Embodiment 1, so that description thereof is omitted herein.

Figure 8:
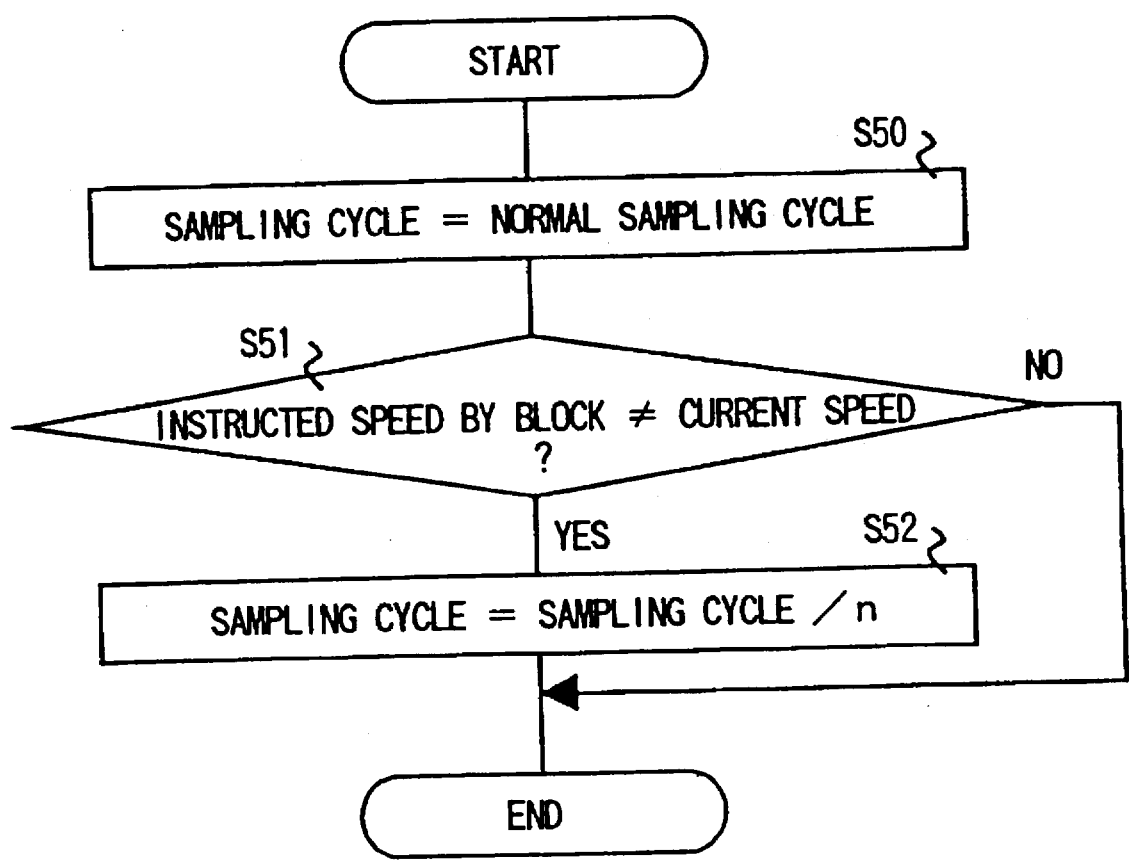
FIG. 8 is a flow chart for explanation of processing by the migration instruction pulse distributing section as well as a sampling time interval computing section according to Embodiment 3.
Figure 9:
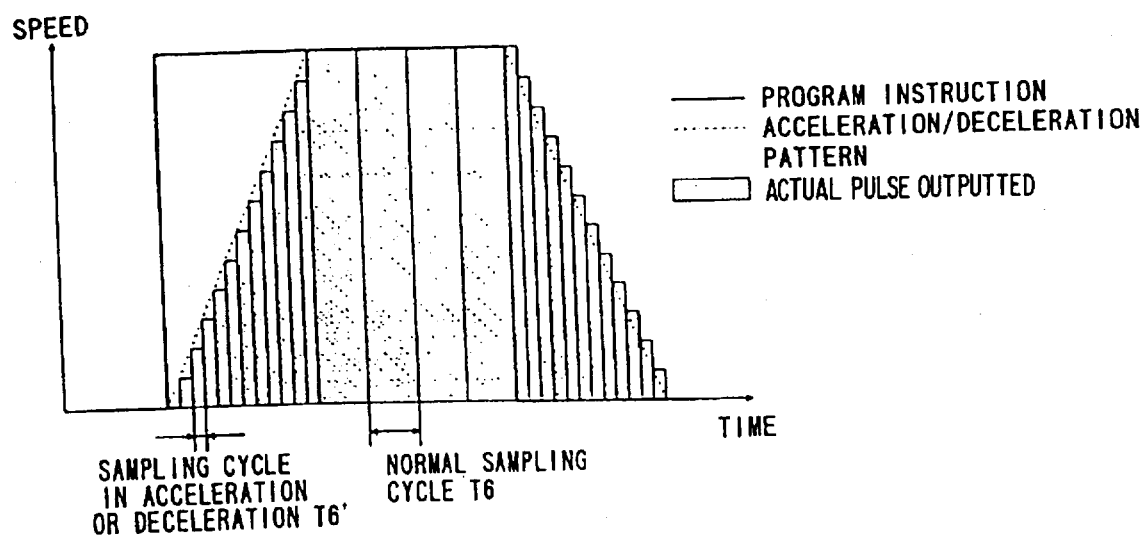
FIG. 9 is an explanatory view of an speed instruction pulse to a concrete instruction for migration according to Embodiment 3.

A detailed description is made for processing in the migration instruction pulse distributing section 14 and the sampling time interval computing section 9 with reference to FIG. 8 and FIG. 9. FIG. 8 is a flow chart showing processing in the migration instruction pulse distributing section 14 as well as in the sampling time interval computing section 9, while FIG. 9 is a view for explanation of an speed instruction pulse to a particular instruction for migration. It should be noted that the concrete example in FIG. 9 shows a speed instruction pulse to an instruction for migration by a program block including control for acceleration or deceleration, and in this figure the solid line and a dashed line indicate a program instruction and an acceleration/deceleration pattern respectively.

The flow chart in FIG. 8 shows processing executed in a sampling cycle for each program block, and step S50 indicates processing executed by the migration instruction pulse distributing section 14, while steps S51 and S52 indicate processing executed by the sampling time interval computing section 9.

At first, in step S50, an ordinary time T6, which is a default value, is set as a sampling cycle.

Next, in step S51, determination is made as to whether an instructed speed by the program block is different from the current feed speed or not, namely whether an instructed speed by the program block is not equal to the current speed or not is determined. As a result, in a case where it is determined that the instructed speed by the program block is equal to the current feed speed, it is regarded that the control for constant speed migration is being provided, the processing is terminated with the current sampling cycle unchanged, and in a case where it is determined that the instructed speed is different from the current feed speed, it is regarded that control for acceleration or deceleration is being provided, and in step S52 the sampling cycle T6 is reset so that it becomes shorter. The second sampling cycle T6' reset as described above is obtained, for instance, from the following equation. Namely;

Sampling time interval=Sampling time interval/n

Herein n is a positive integer (N>1).

Furthermore, although not shown in the flow chart in FIG. 8, the sampling cycle T6 of the second sampling cycle T6' computed in the sampling time interval computing section 9 is outputted to the interruption controlling section 10, migration instruction pulse distributing section 14, and driving section 17, and from the migration instruction pulse distributing section 14 a speed instruction pulse generated according to the sampling cycle T6 or the second sampling cycle T6' is outputted to the accelerating/decelerating section 15.

Figure 23:
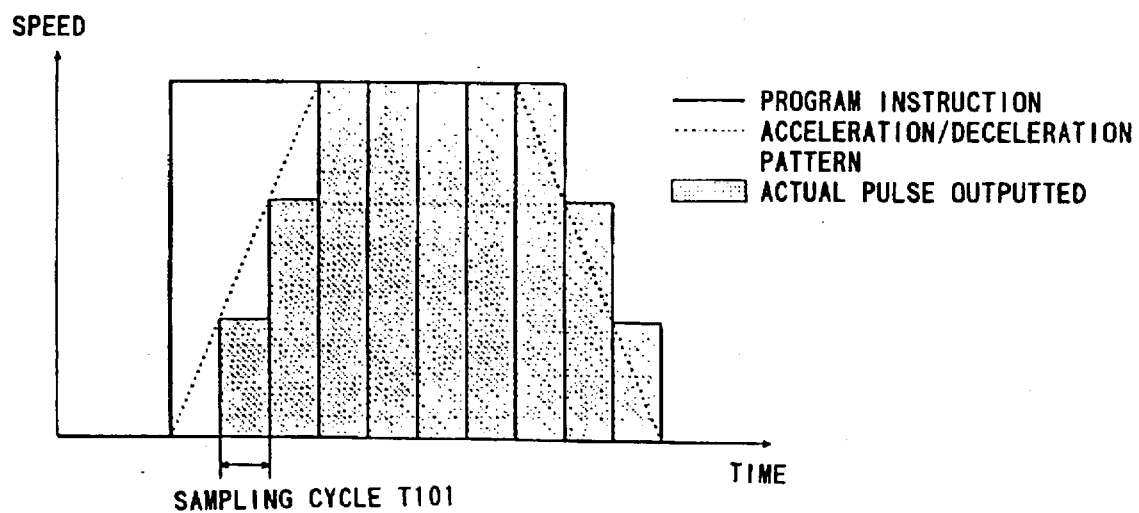
FIG. 23 is an explanatory view of a speed instruction pulse, an instruction for a program, and a pattern in acceleration for a sampling cycle in acceleration or deceleration in the example based on the conventional technology.

FIG. 9 shows a case where n is equal to 4 and the sampling cycle T6' in acceleration or deceleration is made shorter. As shown in this figure, in this case smoother speed control can be provided as compared to a case where a speed instruction pulse is generated according to the ordinary sampling cycle (Refer to FIG. 23).

As described above, in the numerical control device according to the present embodiment, smooth migration control is provided by making a sampling cycle for acceleration or deceleration shorter when generating a speed instruction pulse divided by a sampling cycle from a migration rate and a feed speed for a program block including control for acceleration or deceleration, so that a rapid speed change can be eliminated even in a case where control for acceleration or deceleration is provided and high speed and high precision machining can be executed.

Next, a description is made for a case where smooth migration control is executed by making a sampling cycle for acceleration or deceleration relatively shorter.

Also the configuration of the numerical control device in this case is the same as that in Embodiment 1. However, the function of the sampling cycle computing section 9 is different in the following points. Namely the sampling cycle computing section 9 receives a speed instruction pulse generated according to a sampling cycle (default value) in the migration instruction pulse distributing section 14, and determination is made as to whether the control is for acceleration or deceleration or for constant speed migration in each sampling cycle for a program block, and it is determined that the control is for acceleration or deceleration, the sampling cycle is reset to a second sampling cycle obtained by multiplying the sampling cycle (the default value) with a specified positive integral value.

Next, a description is made for a processing operation by this numerical control device. The processing other than those by the migration instruction pulse distributing section 14 and the sampling time interval computing section 9 is the same as those in Embodiment 1, so that description thereof is omitted herein.

Figure 10:
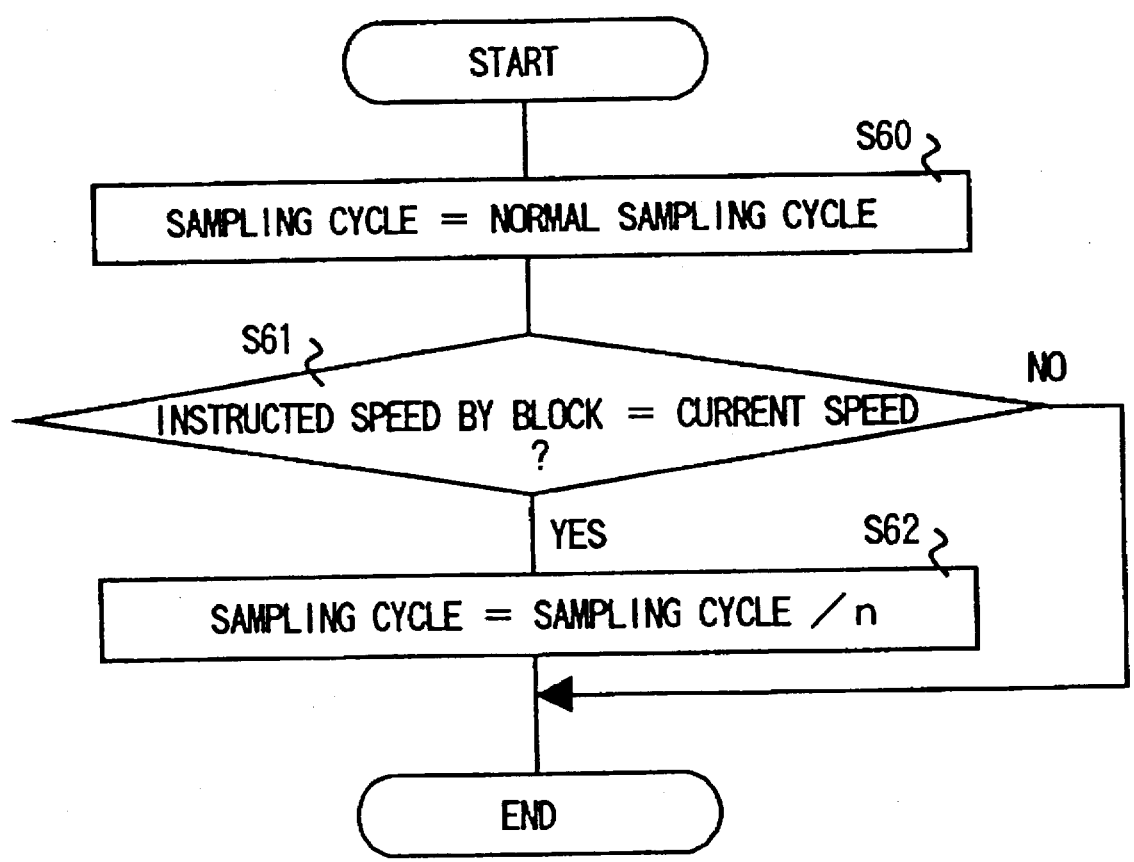
FIG. 10 is a flow chart for explanation of processing by the migration instruction pulse distributing section as well as a sampling time interval computing section according to Embodiment 3.

A detailed description is made for processing by the migration instruction pulse distributing section 14 and the sampling time interval computing section 9 with reference to FIG. 10. FIG. 10 is a flow chart for explanation of processing by the migration instruction pulse distributing section 14 and the sampling time interval computing section. The flow chart in this figure shows processing executed in each sampling cycle for each program block, and step S60 indicates processing executed by the migration instruction pulse distributing section 14, while step S61, S62 indicate processing executed by the sampling time interval computing section 9.

At first, in step S60, as a sampling cycle, an ordinary sampling time (T7), which is a default value, is set.

Next, in step S61, determination is made as to whether an instructed speed by the program block is equal to the current feed speed, namely as to whether the following expression:

Instructed speed by a program block=Current speed is satisfied or not. As a result, in a case where it is determined that the instructed speed by the program block is different from the current feed speed, it is regarded that control for acceleration or deceleration is being provided, and the processing is terminated with the sampling cycle unchanged. In a case where the instructed speed is equal to the current feed speed, it is regarded that now control for constant speed migration is being provided, and in step S62 the sampling cycle T7 is reset so that it becomes longer. The second sampling cycle T7' reset as described above is obtained, for instance, from the following equation. Namely:

Sampling time interval=Sampling time interval×n

Herein n is a positive integral value (n>1).

Furthermore, although not shown in FIG. 10, the sampling cycle T7 or the second sampling cycle T7' computed by the sampling time interval computing section 9 is outputted to the interruption controlling section 10, migration instruction pulse distributing section 14, and driving section 17, and from the migration instruction pulse distributing section 14 a speed instruction pulse generated according to the sampling cycle T7 or second sampling cycle T7' is outputted to the accelerating/decelerating section 15.

As described above, in the numerical control device according to the present embodiment, smooth migration control is provided by making a sampling cycle for acceleration or deceleration relatively shorter when generating a speed instruction pulse divided by a sampling cycle from a migration rate and a feed speed for a program block including control for acceleration or deceleration, so that, even in a case where control for acceleration or deceleration is provided, rapid speed change is eliminated and high speed and high precision machining can be executed. Also by setting a sampling cycle to the ordinary one in acceleration or deceleration and making a sampling cycle longer in control for constant speed migration, a work load to the numerical control device is reduced in the constant speed feed mode, and processing other than for the motor 8 such as, for instance, processing for screen display can be executed at a high speed.

Next, a description is made for a numerical control device according to Embodiment 4 of the present invention. The numerical control device according to the present embodiment does not issue an instruction to an object for control when an instruction for migration has not been issued by a machining program, so that a work load to the numerical control device is reduced.

Configuration of the numerical control device according to the present embodiment is the same as that in Embodiment 3. However, the function of the sampling cycle computing section 9 is different in the following point. Namely, the sampling cycle computing section 9 receives a speed instruction pulse generated according to a sampling cycle (default value) in the migration instruction pulse distributing section 14, determines whether an instruction for migration has been issued or not in each sampling cycle for a program block, and in a case where it is determined that an instruction for migration has not been issued, the sampling cycle is reset to the infinite.

Next, a description is made for processing by the numerical control device according to the present embodiment. Processing other than those by the migration instruction pulse distributing section 14 and the sampling time interval computing section 9 is the same as those in Embodiment 1, so that description thereof is omitted herein.

Figure 11:
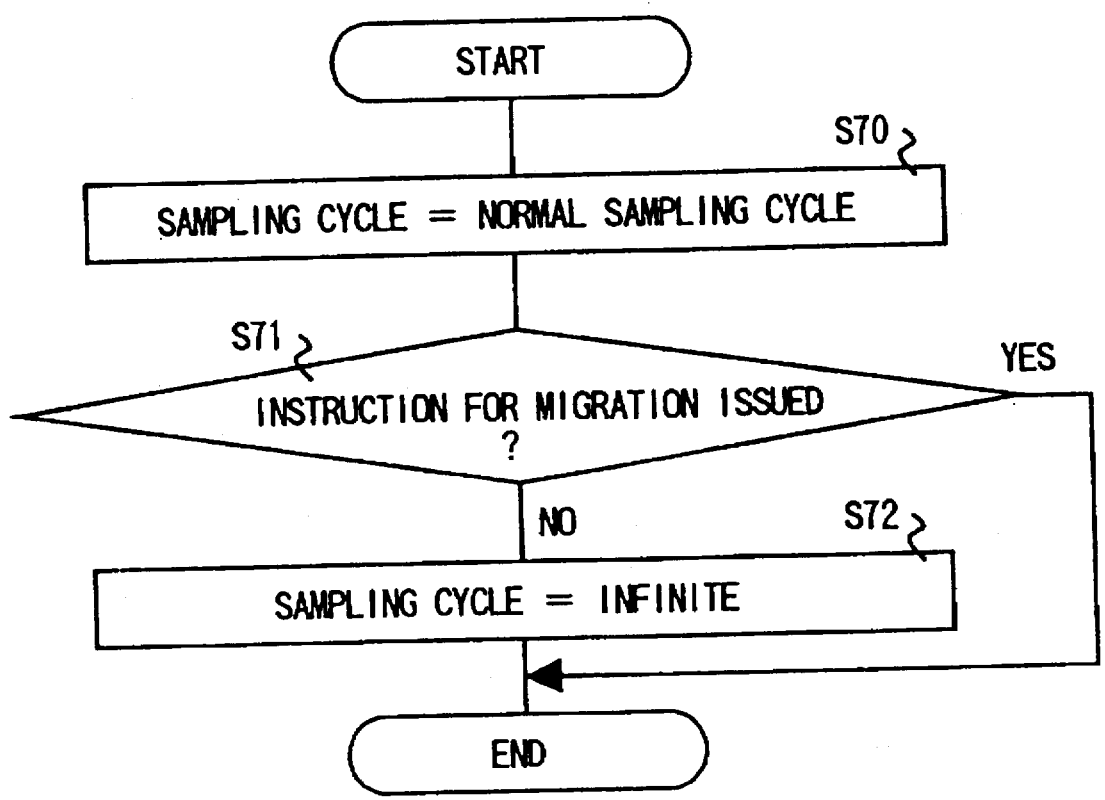
FIG. 11 is a flow chart for explanation of processing by the migration instruction pulse distributing section as well as a sampling time interval computing section according to Embodiment 4.

A detailed description is made for processing by the migration instruction pulse distributing section 14 and the sampling time interval computing section 9 with reference to FIG. 11. FIG. 11 shows a flow chart for explanation of processing by the migration instruction pulse distributing section 14 and the sampling time interval computing section 9. The flow chart in the figure shows processing executed in each sampling cycle for each program block, and step S70 indicates processing executed by the migration instruction pulse distributing section 14, while step S71, S72 indicate processing executed by the sampling time interval computing section 9.

At first, in step S70, as a sampling cycle, a sampling time (T8), which is a default value, is set.

Then in step S71, determination is made as to whether an instruction for migration has been issued or not. In a case where it is determined that an instruction for migration has been issued, the processing is terminated with the sampling cycle unchanged. In a case where an instruction for migration has not been issued, it is regarded that control for constant speed migration is being provided, and in step S72 the sampling cycle is reset to the infinite.

Although not shown in the flow chart in FIG. 11, the sampling cycle T8 is furthermore outputted to the interruption controlling section 10, migration instruction pulse distributing section 14, and driving section 17, and from the migration instruction pulse distributing section 14 a speed instruction pulse generated according to the sampling cycle T8 is outputted to the accelerating/decelerating section 15. For this reason, in a case where the sampling cycle T8 is infinite, a speed instruction pulse is not outputted from the instruction pulse outputting section 16, not a control signal from the driving section, so that a work load to the numerical control device can be reduced.

Next, a description is made for output to the driving section and also for the operating state of the numerical control device in a case where a sampling cycle is made longer than a specified value.

Figure 12A:
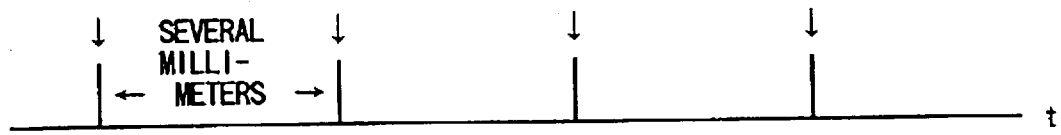
FIGS. 12A and 12B are timing charts showing a timing for normal transmission from the numerical control device to a servo side according to Embodiment 4.

FIG. 12A is a timing chart showing timing for transmission from an ordinary numerical control device to a servo side, and as shown in this figure, an instruction for migration is outputted from the numerical control device to the servo side with an interval of several millimeters (variable). This instruction for migration includes a time until a next instruction is transmitted (a period until time out), and in a case where a next instruction for migration is not sent even if this period for time out has passed, it is determined that any abnormal state has occurred, and an emergency stop signal is outputted.

Figure 12B:

Next, FIG. 12B shows a case where an instruction cycle to the servo side is made very long and processing for transmission in the side of a numerical control device is omitted, and in this case a very long time out period T until the next instruction is set in the final instruction for the numerical control device. For this reason, in the side of servo, after the final instruction is executed, it is not regarded until the time out period T has passed that any abnormal state has occurred, and is kept in the stand-by state. During this period, a time equivalent to a period of time required for transmission actually not executed in the numerical control device can be used for other processing such as screen display or I/O processing.

Figure 13A:
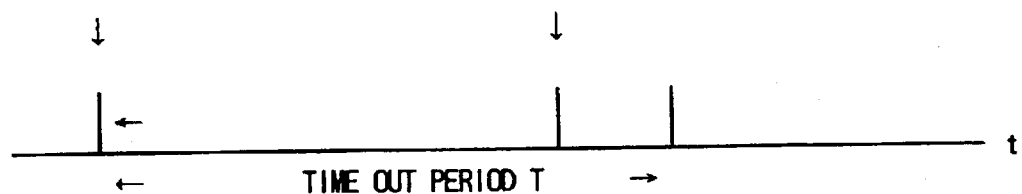
FIGS. 13A and 13B are timing charts showing a normal transmission timing from the numerical control device to the servo side according to Embodiment 4.

If it is required to continue the stand-by state for a period longer than the time out period T, as shown in FIG. 13A, an instruction for the time output period T is outputted again from the numerical control device to the servo side with a migration rate 0 within the time out period T. The servo side continues the stand-by state for the time out period T more after this instruction is received (An abnormal state does not occur).

Figure 13B:
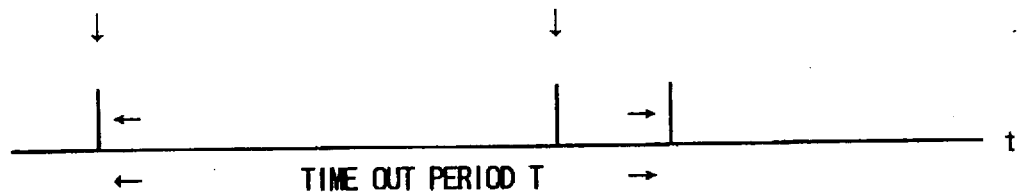

Furthermore, if it is required to restart migration in the servo side within the time out period T, as shown in FIG. 13B, an instruction including a migration rate, which is not zero (0), is outputted from the numerical control device to the servo side within the time out period T. When the servo side receives this instruction, it goes out of the stand-by state, and restarts the ordinary operation for migration.

As described above, in the numerical control device according to the present embodiment, in a case where an instruction for migration has not been issued from a machining program, it does not issue an instruction to an object for control, so that a work load to the numerical control device is reduced when an instruction has not bee issued, and processing other than that for the motor 8 or the like, such as, for instance, screen display, can be executed at a high speed.

Next, a description is made for the numerical control device according to Embodiment 5 of the present invention. The numerical control device according to the present embodiment does not generate a fraction of a sampling cycle by changing the sampling cycle when the fraction has been generated in the sampling cycle when generating a speed instruction pulse from a migration rate and a feed speed for each program block in a case where an instruction for override is received.

Configuration of this numerical control device according to this embodiment is the same as that in Embodiment 1 (Refer to FIG. 1). However, functions of the migration instruction pulse distributing section 14 and the sampling cycle computing section 9 are different from those in Embodiment 1.

Figure 14A:
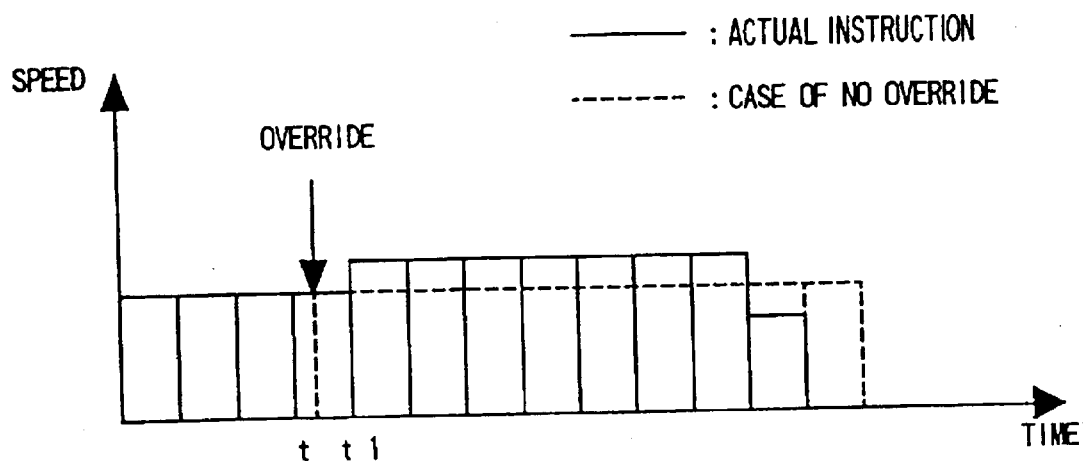
FIGS. 14A an 14B are timing charts showing a state where an override (high-speed) instruction according to Embodiment 5 is received therein.
Figure 14B:
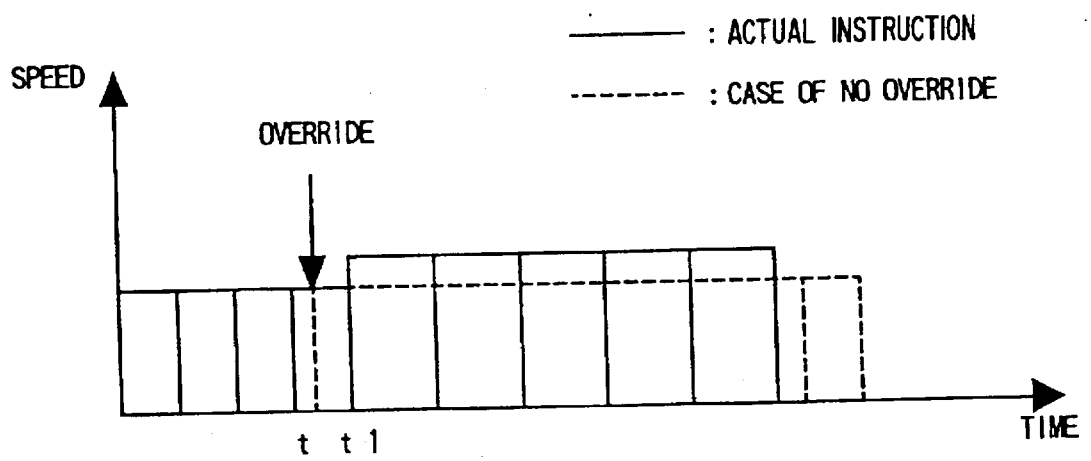

FIGS. 14A and 14B are timing charts showing a speed instruction pulse in a case where an instruction for override (120%) has been entered. In this figure, when the override instruction is inputted at the time point t, a pulse output is amplified 1.2 times from the point t1. In this case, if an instruction is outputted with the sampling cycle before input of the override instruction, a fraction as indicated by the solid line in FIG. 14A is generated in the output pulse. So the sampling cycle is changed as shown in FIG. 14B so that a fraction will not be generated in the instruction pulse.

Figure 15A:
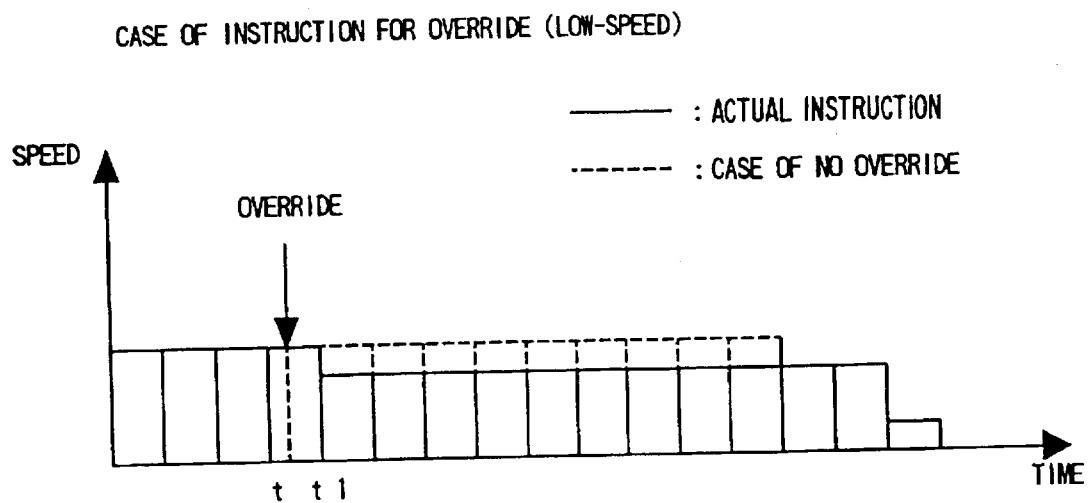
FIGS. 15A and 15B are timing charts showing a state where an override (low-speed) instruction according to Embodiment 5 is received therein.
Figure 15B:
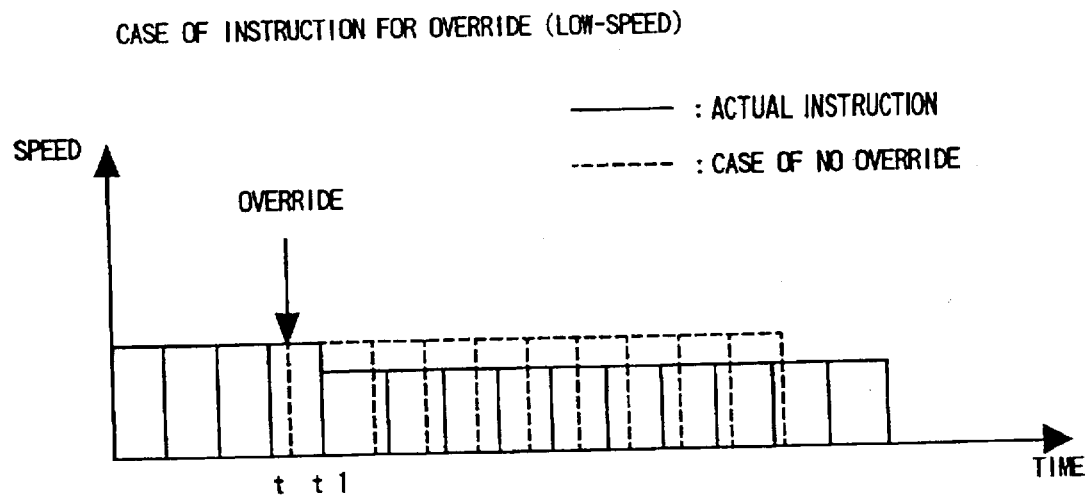

FIGS. 15A and 15B are timing charts showing a speed instruction pulse in a case where an instruction for override (80%) has been inputted. In this figure, when the override instruction is inputted at the time point t, a pulse output is reduced by 0.8 times from the time point t1. In this case, if an instruction is outputted with the sampling cycle before input of the override instruction, a fraction as indicated by the solid line in FIG. 15A is generated in the output pulse. So the sampling cycle is changed as shown in FIG. 15B so that a fraction will not be generated in the instruction pulse.

As described above, in the numerical control device according to the present embodiment, even when an instruction for override is received, a sampling cycle can be changed so that a fraction will not be generated in the instruction pulse, so that, even in override, change in a feed speed and displacement of migration locus generated in an interval of machining between program blocks can be eliminated.

As described above, with the numerical control method according to one aspect of the present invention, in a case where a migration rate and a feed speed in each axial direction are computed from a moving position of a tool and a feed speed of the tool by progressively analyzing a machining program by one program block or a plurality of program blocks, an instruction pulse divided by a specified sampling cycle is generated according to the computed migration rate and feed speed, and output timing of the instruction pulse to an object for control is controlled according to the sampling cycle, the sampling cycle is changed so that a fraction will not be generated in the instruction pulse, whereby a sampling cycle can be changed by one program block or by a plurality of program blocks, and high-precision machining between areas to be machined according to each program block can be realized by eliminating fluctuation in a feed speed and displacement in migration locus generated in an interval of machining between program blocks, and at the same time an allowance for processing in the numerical control device can be generated by reducing a work load to a numerical control device.

In the numerical control method according to another aspect of the present invention, a moving position of a tool and a feed speed of the tool are obtained by progressively analyzing a machining program by one program block or a plurality of program blocks, a migration rate and a feed speed are computed according to the moving position of a tool and feed speed of the tool, a sampling cycle is changed so that a fraction will not be generated in an instruction pulse in one program block or in a plurality of program blocks, the instruction pulse evenly divided by the changed sampling cycle according to the computed migration rate and feed speed is generated, and output timing of the generated instruction pulse to an object for control is changed according to the sampling cycle, whereby a sampling cycle can be changed by one program block or by a plurality of program blocks, and by eliminating fluctuation in a feed speed and displacement in migration locus generated in an interval of machining between program blocks, high-precision machining between areas to be machined according to each program block can be realized, and at the same time by reducing a work load to a numerical control device, an allowance for processing by the numerical control device can be generated.

In the numerical control device according to one aspect of the present invention, an analyzing means obtains a moving position of a tool and a feed speed of the tool by progressively analyzing a machining program by one program block or by a plurality of program blocks, an interpolating means computes a migration rate and a feed speed according to the moving position of a tool and feed speed of the tool, a sampling cycle computing means changes a sampling cycle so that a fraction of an instruction pulse will not be generated in the one program block or in the plurality of program blocks, an instruction pulse generating means generates an instruction pulse evenly divided by the changed sampling cycle according to the computed migration rate and feed speed, and a sampling control means controls output timing of the generated instruction pulse to an object for control according to the sampling cycle, whereby a sampling cycle can be changed by one program block or by a plurality of program blocks, and by eliminating fluctuation in a feed speed and displacement in migration locus generated in an interval of machining between program blocks, high-precision machining between areas to be machined according to each program block can be realized, and at the same time by reducing a work load to a numerical control device, an allowance for processing by the numerical control device can be generated.

In the numerical control device according to another aspect of the present invention, the sampling cycle computing means equalizes a sampling cycle, whereby high-precision machining between areas to be machined according to each program block can be realized by eliminating fluctuation in a feed speed and displacement in migration locus generated in an interval of machining between program blocks, and at the same time an allowance for processing by the numerical control device can be generated by reducing a work load to a numerical control device.

In the numerical control device according to another aspect of the present invention, the sampling cycle computing means changes a sampling cycle more largely than the initial sampling cycle when, in a final sampling cycle by the one program block or by the plurality of program blocks, an instruction pulse for the final sampling cycle is a fraction smaller than an instruction pulse in other sampling cycle, whereby a work load to the numerical control device can be reduced.

In the numerical control device according to another aspect of the present invention, the sampling cycle computing means determines according to the feed speed computed by the interpolating means whether the current operating mode is in acceleration or deceleration or in migration at a constant speed, sets a sampling cycle to a shorter period of time than that for migration at a constant speed in acceleration or deceleration, and sets a sampling cycle to a longer period of time than that for acceleration or deceleration in migration at a constant speed. As described above, a sampling cycle is made smaller period of time in acceleration or deceleration, which makes it possible to control a speed by changing it smoothly, and also a sampling cycle is made longer period of time in a migration at a constant speed, which allows fine control for migration in machining in accordance with rapid acceleration or deceleration, and for this reason, machining precision to a work can be improved, and a work load to a numerical control device can be reduced.

In the numerical control device according to another aspect of the present invention, the sampling cycle computing means determines whether an instruction for migration has been issued or not, sets a sampling cycle to a period of time longer than a specified value, for instance, to an infinite period of time when an instruction for migration has not been issued, and sets the device in the stand-by state, whereby a work load to the numerical control device can be reduced, and as a result processing other than control to an object for control, such as, for instance, screen display can speedily be executed.

In the numerical control device according to another aspect of the present invention, the sampling cycle computing means changes, when it receives an override instruction, a sampling cycle so that a fraction will not be generated in the instruction pulse, whereby fluctuation in a feed speed and displacement in migration locus generated in an interval of machining between program blocks are eliminated even in the override mode, which allows high-precision machining between areas to be machined according to each program block, and at the same time an allowance for the processing of the numerical control device can be generated by reducing a work load to the numerical control device.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A numerical control method comprising the steps of:
   computing a migration rate and a feed speed in each axial direction from a moving position of a tool by progressively analyzing a machining program by increments of at least one program block;
   generating instruction pulses according to a specified sampling cycle based on the computed migration rate and feed speed;
   controlling an output timing of the instruction pulses to a controlled object according to the sampling cycle; and
   resetting the sampling cycle so that a fraction of an instruction pulse will not be generated in a final sampling cycle of the at least one program block.

2. A numerical control method comprising the steps of:
   obtaining a moving position of a tool by progressively analyzing a machining program by increments of at least one program block;
   computing a migration rate and a feed speed according to the moving position of the tool;
   resetting a sampling cycle, based on the migration rate and the feed speed, so that a fraction of an instruction pulse will not be generated in the at least one program block;

periodically generation instruction pulses, having widths of an integer multiple of the reset sampling cycle, according to the reset sampling cycle; and controlling an output timing of the instruction pulses to a controlled object according to the reset sampling cycle.

3. A numerical control device comprising:

an analyzing means for obtaining a moving position of a tool by progressively analyzing a machining program by increments of at least one program block;

an interpolating means for computing a migration rate and a feed speed of the tool according to the moving position of the tool;

a sampling cycle computing means for resetting a sampling cycle, based on the migration rate and the feed speed of the tool, so that a fraction of an instruction pulse will not be generated in the at least one program block;

an instruction pulse generating means for periodically generating instruction pulses, having widths of an integer multiple of the reset sampling cycle, according to the reset sampling cycle; and a sampling control means for controlling a timing of an output, to a controlled object, of the instruction pulses generated by the instruction pulse generating means.

4. A numerical control device according to claim 3, wherein the sampling cycle computing means equalizes the sampling cycle.

5. A numerical control device according to claim 3, wherein the sampling cycle computing means resets the sampling cycle to be larger than an initial sampling cycle when an instruction pulse in a final sampling cycle of the at least one program block is a fraction smaller than instruction pulses in other sampling cycles of the at least one program block.

6. A numerical control device according to claim 3, wherein the sampling cycle computing means determines according to the feed speed whether the device is operating in an acceleration mode, a deceleration mode, or a constant-speed mode, and resets the sampling cycle such that a sampling cycle during the acceleration and mode and a sampling cycle during the deceleration mode each have a shorter period of time than a sampling cycle during the constant-speed mode.

7. A numerical control device according to claim 3, wherein the sampling cycle computing means determines whether an instruction for migration has been issued, sets a sampling time to a period of time longer than a specified value when an instruction for migration has not been issued, and sets the device to the stand-by state.

8. A numerical control device according to claim 3, wherein the sampling cycle computing means resets the sampling cycle when the computing means receives an override instruction so that a fraction of an instruction pulse will not be generated in the at least one program block.

* * * * *